United States Patent
Tanaka

(10) Patent No.: US 6,741,656 B1
(45) Date of Patent: May 25, 2004

(54) IMAGE COMMUNICATION APPARATUS

(75) Inventor: Yosuke Tanaka, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/464,097

(22) Filed: Dec. 16, 1999

(30) Foreign Application Priority Data

Dec. 16, 1998 (JP) .......................................... 10-357517

(51) Int. Cl.⁷ ................................................ H04N 7/12
(52) U.S. Cl. ................................................ 375/240.26
(58) Field of Search .................... 379/93.21; 348/423.1, 348/512; 386/68, 33, 111, 112; 725/95, 94, 96, 117, 118; 375/138, 141, 220, 240, 240.26

(56) References Cited

U.S. PATENT DOCUMENTS

| | | | |
|---|---|---|---|
| 5,040,081 A | * 8/1991 | McCutchen | 360/14.3 |
| 6,003,118 A | * 12/1999 | Chen | 711/167 |
| 6,014,706 A | * 1/2000 | Cannon et al. | 709/231 |
| 6,128,649 A | * 10/2000 | Smith et al. | 709/217 |
| 6,154,771 A | * 11/2000 | Rangan et al. | 709/217 |
| 6,536,043 B1 | * 3/2003 | Guedalia | 725/90 |

FOREIGN PATENT DOCUMENTS

| | | |
|---|---|---|
| JP | 405137135 A | * 6/1993 |
| JP | 5-336517 | 12/1993 |
| JP | 10-164138 | 12/1996 |

* cited by examiner

Primary Examiner—Chris Kelley
Assistant Examiner—Behrooz Senfi
(74) Attorney, Agent, or Firm—RatnerPrestia

(57) ABSTRACT

In an image communication apparatus such as television conference system, when transmitting a dynamic image in real time, it is sometimes changed over to an accumulated image on the way, and a long waiting time is often experienced at the reception side until reproduction of the accumulated image is started depending on the relation between the time information TR of the bit stream of the dynamic image immediately before changeover and the time information TR possessed by the accumulated image. The invention comprises means for correcting the time information existing in every frame of the bit stream by force when sending out the video bit stream being read out from a video accumulation device. As a result, the time from display start point of the final frame of the real-time dynamic image until display start point of bit stream of accumulated image can be kept constant by force, so that reproduction of accumulated image is started immediately regardless of the changeover timing.

7 Claims, 17 Drawing Sheets

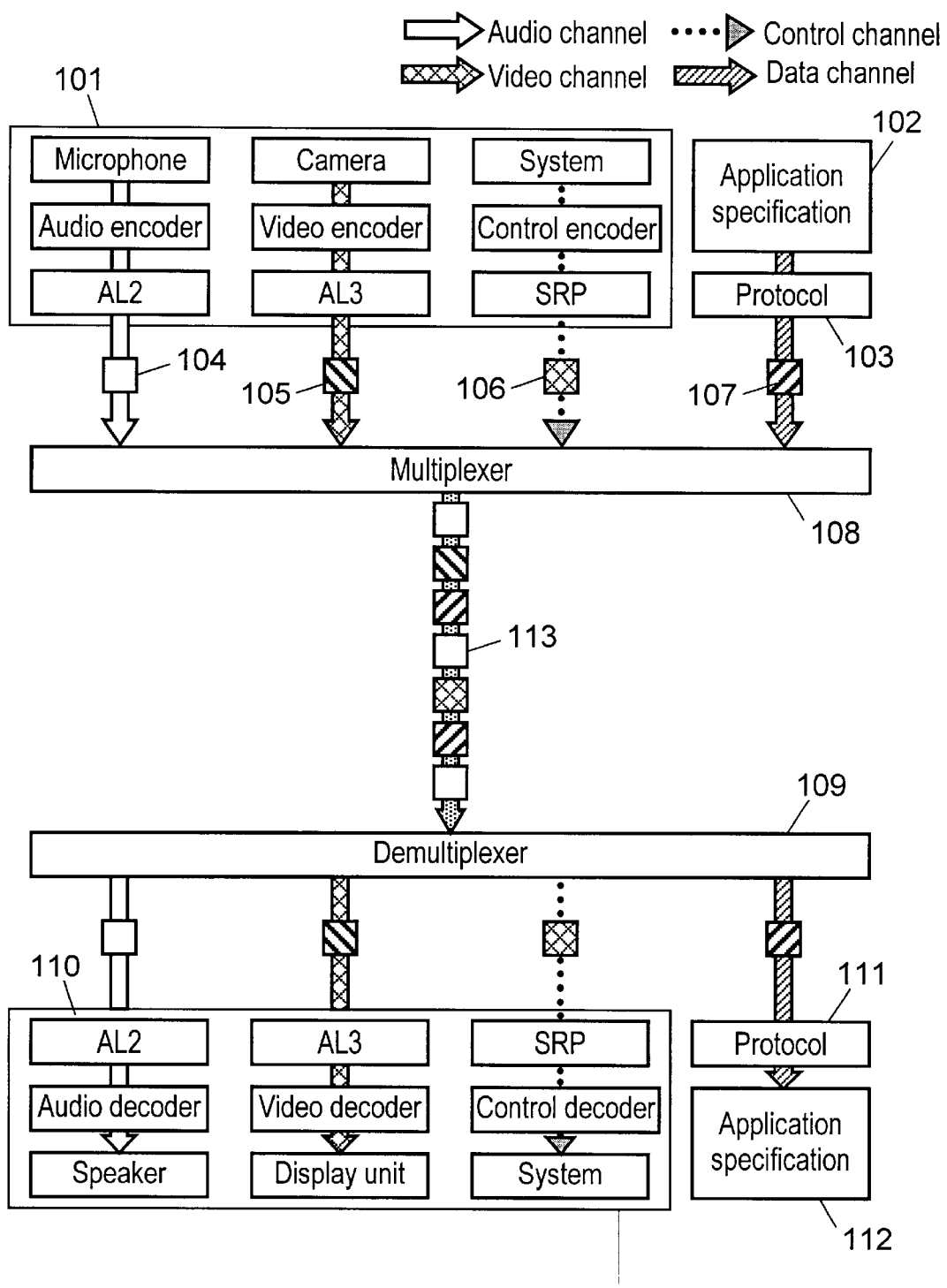

301 First frame of accumulated video data
302 Last frame issued from encoder
304 Frame after time information replacement of first frame of accumulated video data
305 Display start position of last frame issued from encoder
306 Display start position of first frame of accumulated video data

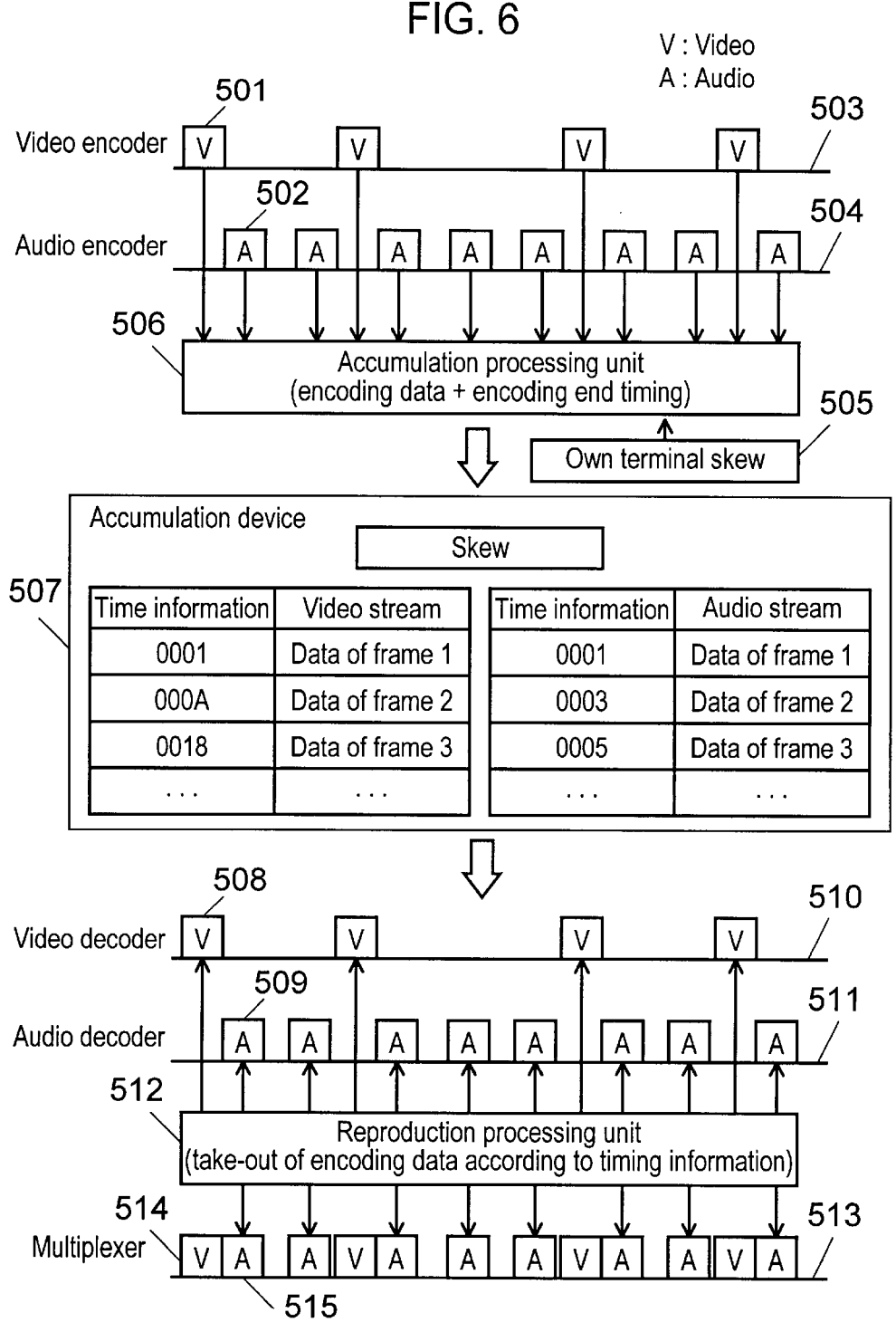

IMAGE COMMUNICATION APPARATUS

FIELD OF THE INVENTION

The present invention relates to an image communication apparatus for transmitting and receiving dynamic images, still images, audio signals, and others, and more particularly to synchronization of timing when transmitting and receiving by inserting preliminarily accumulated dynamic images and still images into real-time dynamic images and still images.

BACKGROUND OF THE INVENTION

FIG. 1 is a structural diagram showing a standard H.324 terminal device in which ITU-T Recommendation H.324 is applied as a prior art.

In FIG. 1, crude data such as audio data, video data, and control data generated by microphone, camera, and system in a standard transmission capacity generation unit 101 having a standard transmission capacity of H.324 are encoded in audio encoder, video encoder, and control encoder, respectively. Using transmission protocols of AL2, AL3, SRP corresponding to the encoded data, they are issued as a bit stream 104 of audio encoded data, a bit stream 105 of video encoded data, and bit stream 106 of connection control encoded data. From an application specification storage unit 102 for storing an application specification for using a non-standard capacity, a bit stream 107 of data is issued through a protocol storage unit 103 for storing a transmission protocol of data channel. A multiplexer 108 assembles bit streams 104 to 107 into one packet, and sends out to a transmission path 113 as multiplexed data. A demultiplexer 109 separates the multiplexed data transmitted through the transmission path 113 into individual bit streams. Separated bit streams of video encoded data and connection control encoded data are received in a standard reception capacity generation unit 110 having a standard reception capacity of H.324 by using reception protocols corresponding to AL2, AL3 and SRP, and are respectively decoded in an audio decoder, a video decoder, and a control decoder, and issued to speaker, display unit, and system as audio data, video data, and control data. Data of non-standard capacity is issued to an application specification storage unit 112 for storing an application specification for using non-standard capacity through a protocol storage unit 111 for storing a reception protocol of data channel of non-standard capacity.

The standard H.324 terminal device shown in FIG. 1 is composed of three channels, that is, a control channel for managing the connection information between terminal devices, a dynamic image channel for transferring a dynamic image bit stream encoded in real time, and an audio channel for transferring an audio bit stream encoded in real time. For such data transfer, a standard specific transfer protocol designated by ITU-T Recommendation is used, and therefore exchange of real-time sound, real-time dynamic image and connection information is possible among all terminal devices.

If other functions than such standard functions are required, a data channel having a transfer protocol for such function (a protocol stored in the protocol storage unit 103) is needed, and it also requires an application specification for using such data (an application specification stored in the application specification storage unit 102). There are various types of transfer protocol and application specification depending on the purpose. It is, however, not always guaranteed that the terminal device at the destination side has the same protocol and specification as possessed at the sender's side. Accordingly, at the time of start of connection, using the control channel, it is judged if usable or not by mutually checking the additional functions provided in the individual terminal devices.

In a television conference system, real-time video and audio are entered at the same time. Being encoded in the individual encoders, video and audio bit streams issued from encoders are immediately sent into the multiplexer, and the multiplexed bit stream is transmitted to the terminal device at the destination. Since they are immediately multiplexed after generation and transmitted, the synchronism of video and audio is maintained. However, the required encoding time differs between audio and video signals, and if put in the same time width, video encoding takes a longer time than audio encoding. If mixed right after generation of data, synchronization is actually deviated by the portion of this time difference.

Incidentally, the video bit stream designated, for example, in H.263 has time information TR of absolute time for turning one round in every eight seconds approximately in order to indicate the display start time of the image in every frame. The transmission side has a time counter for turning one round in every eight seconds, and on the basis of this time counter, the time information TR is inserted in each frame in the bit stream. The decoder adjusts the display changeover timing of each frame for composing a dynamic image on the basis of the time axis managed by itself and the time information TR in the video frame.

Problems occurring when inserting preliminarily accumulated images into real-time images are discussed below while referring to an example of television conference system. FIG. 2 (a) shows the stream state of encoder and decoder, and the stream state of accumulated video data when passing accumulated video data in video channels in the conventional television conference system, and FIG. 2 (b) shows the display timing of each frame when changing over from the real-time image to accumulated image.

In FIG. 2, reference numeral 201 shows a first frame of accumulated video data, and 202 shows a last frame of real-time video data issued from an encoder. Reference numeral 203 shows the display start position of last frame of real-time video data issued from the encoder, and 204 is the display start position of first frame of accumulated video data.

In the television conference system, when changing over from the video bit stream flowing in the video channel to the accumulated video bit stream, the difference between the time information TR (202) of the last frame 202 of the real-time dynamic image bit stream, and the time information TR (201) of the first frame 201 of the accumulated video bit stream is the time width from he display start point 203 of the last frame of the real-time dynamic image on the decoder till the display start point 204 of the first frame of the accumulated image. In the example in FIG. 2 (b), the time width 205 from the display start point 203 of the last frame of the real-time dynamic image till the display start point 204 of the first frame of the accumulated image is variable with the changeover timing, and it may be about eight seconds at worst, and in this period, therefore, the real-time last image is displayed as a still image.

In the conventional television conference system, for the purpose of strict synchronization, the synchronization deviation information called skew is transmitted to the terminal device at the destination separately through a control channel, and by adjusting the synchronization by its value, strict synchronization of video and audio is realized on the terminal device at the destination.

In the television conference system, while transmitting the dynamic image in real time, it is often changed over to preliminarily accumulated images (dynamic image or still image) on the way. For example, if attempted to transmit an accumulated still image by using a dynamic image channel according to the H.263 regulation, the image bit stream designated in the H.263 is variable in the time difference between the time information TR of the last frame of the bit stream of the dynamic image immediately before changeover, and the time information TR of the first frame of the accumulated image bit stream, when changed over from the image bit stream flowing in the video channel in the real time to the accumulated image bit stream, and, depending on the circumstance, there is a considerably long waiting time until reproduction of still image starts at the reception side.

If the transmission side and reception side have non-standard original transfer protocol for transfer of still image, it can be changed over to the still image according to the transfer protocol, but the both terminals to be connected are required to have the transfer protocol and application specification of the same specification.

SUMMARY OF THE INVENTION

The invention is devised to improve the problems of the prior art mentioned above, and it is an object thereof to present an image communication apparatus capable of transmitting and receiving accumulated dynamic images and still images without causing the aforesaid inconvenience, without requiring any particular transfer protocol or application at the destination side, if having a standard transfer protocol.

A first aspect of the invention relates to an image communication apparatus for reading and displaying preliminarily accumulated images, or directly displaying the images in the process of encoding or decoding, which comprises means for correcting and issuing time information existing in every frame in the bit stream of accumulated images when sending out the bit stream being read out from an image accumulation device.

In this constitution, in the transmitting direction or receiving direction, the time from the display start point of the last frame of the image in the process of encoding or decoding till the display start point of the accumulated bit stream can be kept constant by force, and the time difference between the bit stream of the image in the process of encoding or decoding flowing in the video channel and the bit stream of the preliminarily accumulated image can be absorbed.

A second aspect of the invention relates to an image communication apparatus for transferring real-time dynamic image or still image, which comprises time information correcting means for correcting and processing the time information portion in the frame of the video bit stream, in which when sending out the bit stream of still image being read out from an image accumulation device, the same video information as the video information of the still image bit stream once transmitted and corrected only of the time information existing in every frame of the still image bit frame transmitted previously is issued at a specific interval.

In this constitution, breakdown of the image decoder can be prevented, and the non-standard use of preliminarily accumulated still images is enabled.

A third aspect of the invention relates to an image communication apparatus which comprises an accumulation device for accumulating video or audio bit streams, and an accumulation processing unit for accumulating the data and encoding end time of each frame of bit streams in the accumulation device, in which when accumulating the bit streams in the accumulation device, the accumulation processing unit stores the data and encoding end time of each frame in the accumulation device while distinguishing between audio and video data.

In this constitution, when reproducing at the own terminal or the destination terminal, since the take-out timing of video and audio bit streams can be adjusted on the basis of the data and encoding end time of each frame, at the time of data output from the accumulation device to the multiplexer or encoder, audio and video synchronization is achieved. Moreover, since the accumulation processing unit accumulates also the skew of the own terminal, strict synchronous take-out of audio and video signals is realized.

A fourth aspect of the invention relates to an image communication apparatus for receiving and accumulating video and audio bit streams sent from other communication terminal, which comprises an accumulation device for accumulating video or audio bit streams, and an accumulation processing unit for accumulating data of each frame of bit stream and reception time of frame beginning position in the accumulation device, in which when accumulating the received bit stream in the accumulation device, the accumulation processing unit stores the data of each frame and reception time of each frame beginning position in the accumulation device while distinguishing audio and video data.

In this constitution, when reproducing, since the take-out timing of video and audio bit streams can be adjusted on the basis of the data of each frame and reception time of frame beginning position, at the time of data output from the accumulation device to the multiplexer or encoder, audio and video synchronization is achieved. Moreover, since the accumulation processing unit accumulates also the skew of the transmission side terminal, strict synchronous take-out of audio and video signals is realized.

BRIEF DESCRIPTION OF THE DRAWINGS

FIG. 1 is a structural diagram showing a standard H.324 terminal device of a prior art;

FIG. 2 (b) is a diagram explaining the problem of flow of accumulated video data in a video channel in a conventional television conference system.

FIG. 4 (b) is an explanatory diagram schematically showing the image communication apparatus in embodiment 1 of the invention;

FIG. 5 (b) is an explanatory diagram showing processing timing of an encoder in the transmission unit of the image communication apparatus;

FIG. 6 is an explanatory diagram about accumulation of bit stream generated by the own terminal side encoder in the image communication apparatus in embodiment 1 of the invention;

DETAILED DESCRIPTION OF THE EMBODIMENTS

Figure 2A:
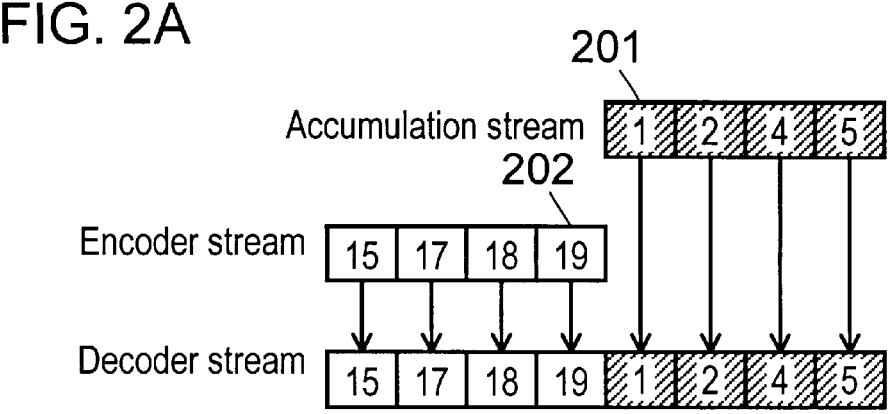
FIG. 2 (a) is a diagram explaining the problem of flow of accumulated video data in a video channel in a conventional television conference system.

Referring now to the drawings, embodiments of the invention are described in detail below.

Embodiment 1

Figure 2B:
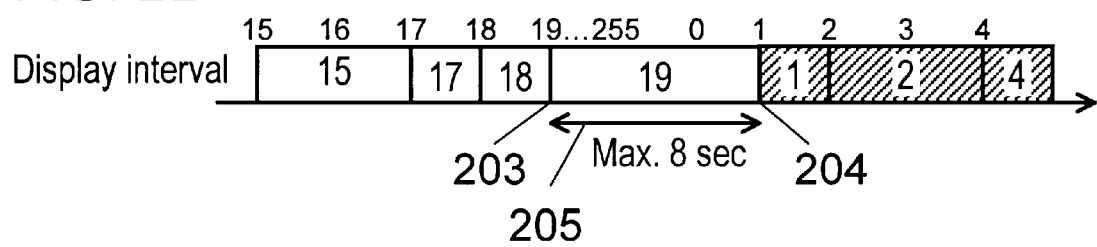
Figure 3:
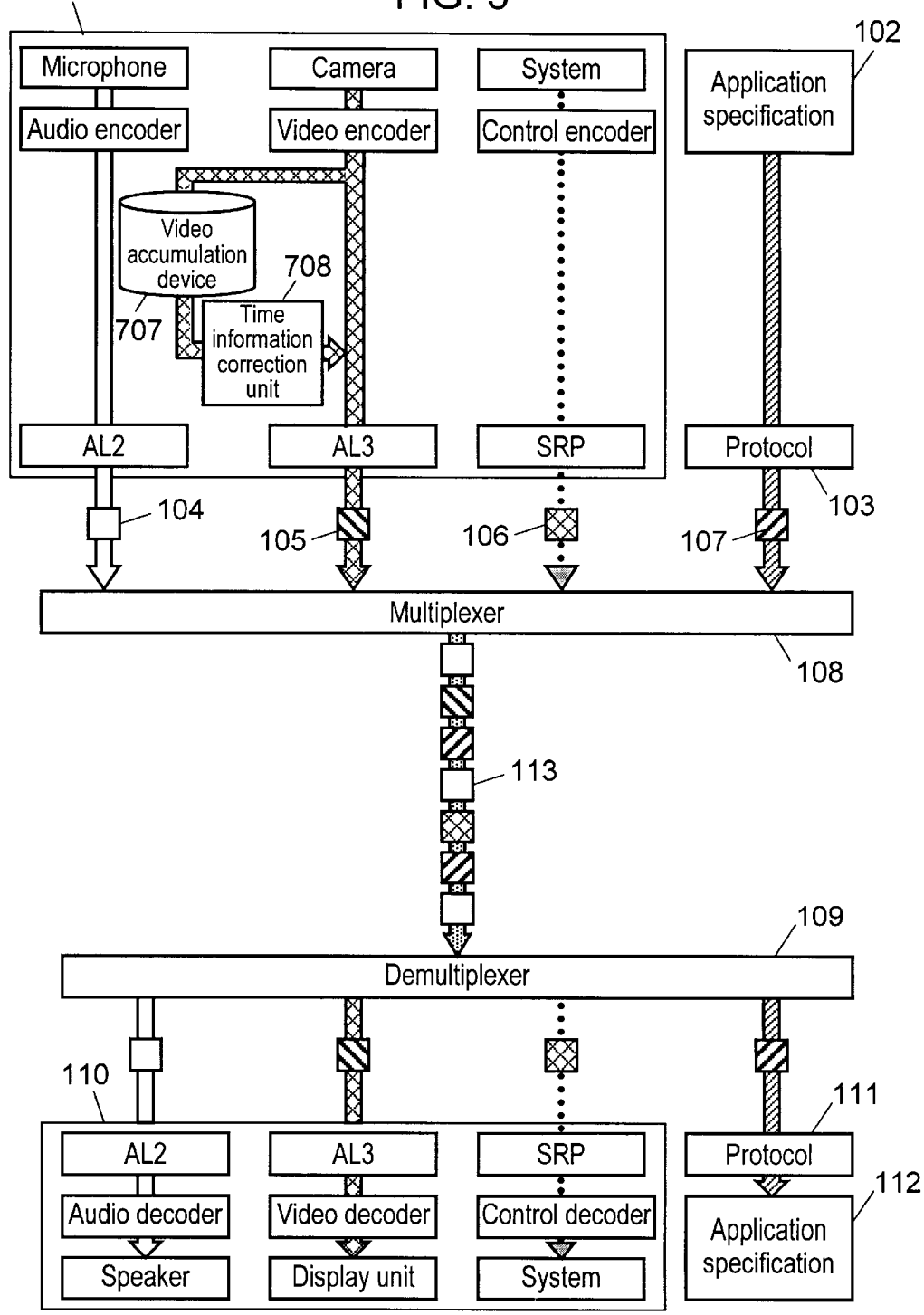
FIG. 3 is a structural diagram showing a standard H.324 terminal device of the invention.

An image communication apparatus in embodiment 1 of the invention is described while referring to FIG. 3 to FIG. 7. FIG. 3 is a structural diagram showing a standard H.324 terminal device of the invention, FIGS. 4 (*a*) and (*b*) are explanatory diagrams schematically showing the invention for solving the problems in FIG. 2, and FIGS. 5 (*a*) and (*b*) are explanatory diagrams of still image data transfer.

Figure 4A:
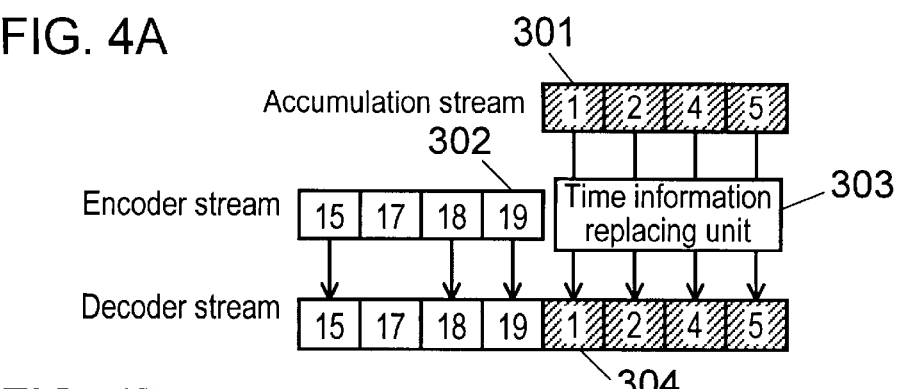
FIG. 4 (a) is an explanatory diagram schematically showing an image communication apparatus in embodiment 1 of the invention.
Figure 4B:
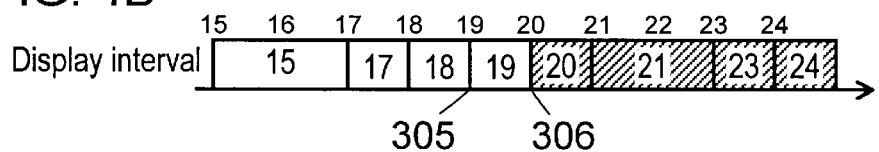

In FIG. 3, what differs from the prior art in FIG. 1 is that an image accumulation device 707 and a time information correction unit 708 are added between the image encoder and image transmission protocol AL3, in the standard transmission capacity generation unit 101, as means of bypass for changing over between them. Other same functional parts as in FIG. 1 are identified with same reference numerals, and their description is omitted. In FIG. 4, reference numeral 301 shows a first frame of accumulated video data, 302 is a last frame of real-time video data issued from the encoder, 303 is a time information replacing unit for replacing the time information portion in the frame, 304 is a frame after time information replacement of the first frame of the accumulated video data, 305 is a display start point of last frame of real-time video data issued from the encoder, and 306 is a display start point of first frame of accumulated video data.

In this embodiment, as shown in FIG. 4, the time information existing in every frame (information for composing one image) in preliminarily accumulated video bit stream is corrected in the time information replacing unit 303. For example, the time information of each frame in the video bit stream being read out from the accumulation device is replaced with a value subtracted by a specific value in the time information replacing unit 303.

For example, as shown in FIG. 4, at the time of output of accumulated video bit stream, the time information replacing unit 303 replaces the time information TR existing in the first frame 301 of the still image with the position deviated by an arbitrary time from the display start point of the last frame (19th frame) 302 of the real-time image, and replaces with a new frame 304 having the changed time information TR. Thus, the time information TR is transmitted as a new changed frame 304.

By thus changing to the position deviated by an arbitrary time, the duration from the display start point 305 of the last frame (19th frame) of the real-time image till the display start point 306 of the accumulated bit stream (displayed in the 20th frame) can be kept constant (by force). In this way, the consequent accumulated frames are deviated in all frames by the same time information TR as the initial correction value, so that the display interval of each frame of accumulated video data is always the same. As a result, the time difference between the video bit stream of the real-time video data flowing in the video channel and the video bit stream of video data being read out from the accumulation device can be absorbed.

By this process, when the user operates to change over the content of the accumulated video data and the content of the real-time video data flowing in the video channel in the transmission direction, whether in the case of reproduction of the accumulated video bit stream in the own terminal device or in the case of transmission to the partner and reproduction at the destination side, reproduction of accumulated images is started immediately regardless of the timing of changeover signal to change over to the accumulation device, and the display is changed over without long waiting time. Not only in transmission, but also in the reception direction from the partner, when the content of the real-time video data flowing in the video channel and the content of the accumulated video data are changed over, the display is changed over without long waiting time.

Figure 5A:
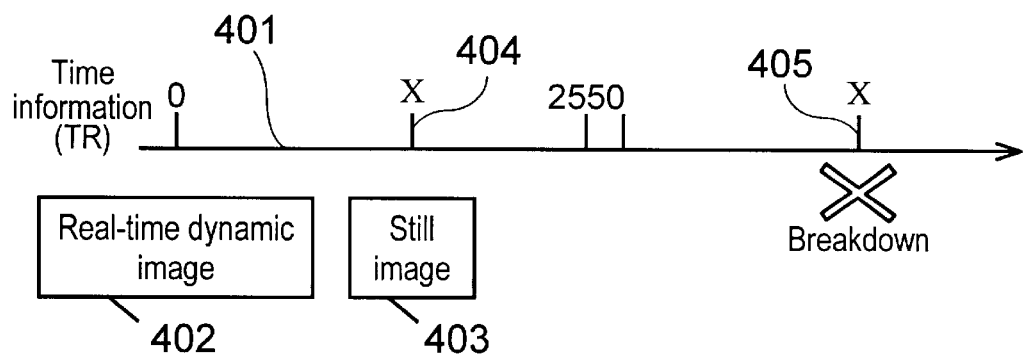
FIG. 5 (a) is an explanatory diagram showing processing timing of a decoder in the reception unit of the image communication apparatus.
Figure 5B:
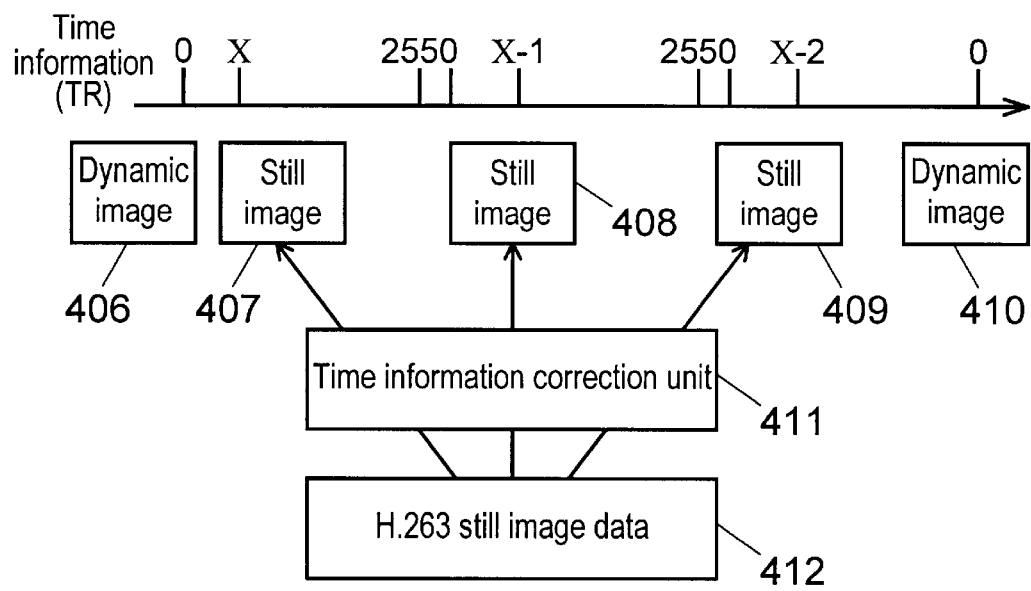

Next, when transferring the non-real-time still image accumulated as H.263 code data on the dynamic image channel, the process is explained below. FIG. 5 (*a*) is a timing diagram of processing of decoder in the reception unit. In the diagram, reference numeral 401 is a time axis, 402 is a video bit stream of real-time dynamic image issued from the encoder, 403 is data of one still image encoded according to ITU-T Recommendation H.263, and 404 is the time information in the still image data. Reference numeral 405 shows the breakdown position in the case breakdown occurs in the decoder.

FIG. 5 (*b*) is a timing diagram of processing of encoder in the transmission unit. In the diagram, reference numeral 406 is a video bit stream of real-time dynamic image issued from the encoder, 407, 408 and 409 are still image data accumulated after correction of time information, 410 is a video bit stream of real-time dynamic image issued from the encoder, 411 is the time information correction unit, and 412 is H.263 encoded data of one accumulated still image.

As shown in FIG. 5, according to the regulation of H.263, the decoder breaks down at position 405 where the continuous display time of a certain still image is longer than the time of one round of time information (256 count time of TR) (FIG. 5 (*a*)). In the embodiment of the invention, next video information is transferred before the continuous display time of still image exceeds the time of one round of time information. That is, the still image bit stream rewriting only the time information of the still image bit stream once transmitted is sent again at a specific time interval. Thus, if the image content is the same, by sending again at a specific time interval, breakdown can be avoided. In this case, the time information TR of the still image bit stream to be sent again is set at the longest image interval so as not to cause breakdown. For example, the time information TR of the video data is a value subtracting one from the time information TR of the last video data transmitted. The numerical value is not limited to one, and anyway the TR should not reach 256 counts. Since the still image sent first and the still image sent again are same in the video information, and therefore the video information is not sent in this period, so that wasteful transmission of bit stream can be decreased, and this period may be used for transmission of other information.

Thereafter, if maintaining the still image state, same processing is done before reaching breakdown point, and the still image bit stream rewriting only the time information is sent repeatedly at specific interval before reaching breakdown, so that the still image state may be maintained infinitely. As mentioned above, the time information TR of video bit stream makes one round in about every eight seconds, but since the same image is sent out within eight seconds after once sending out the still image bit stream, the interval between two images is not more than this period.

In embodiment 1, the method of bit stream accumulation for reproduction at the own terminal device synchronized between audio and video data or transmission to the terminal device at the destination is explained below.

FIG. 6 is a diagram explaining the accumulation method of bit streams of the encoder at the own terminal device in the case of transmission of video and audio data from the own terminal device to the terminal device at the destination. In FIG. 6, reference numeral 503 is a time axis of a video encoder, 504 is a time axis of an audio encoder, 501 is a generation position of video encoding frame, 502 is a generation position of audio encoding frame, and 505 is a time difference required for encoding of audio and video, which is known as the own terminal skew. Reference numeral 506 is an accumulation processing unit, and 507 is an accumulation device.

Reference numeral 510 is a time axis of video decoder, 511 is a time axis of audio decoder, 508 is a decoding start position of video encoding frame, 509 is a decoding start position of audio encoding frame, 512 is a reproduction processing unit, 513 is a time axis of multiplexer, 514 is a multiplexed bit stream position of video encoding frame, and 515 is a multiplexed bit stream position of audio encoding frame.

When accumulating encoded audio data and video data in the accumulation device 507, as shown in FIG. 6, the accumulation processing unit 506 stores the encoding data of video and audio frames, video encoding end time and audio encoding end time in the accumulation device 507 while distinguishing between audio and video.

At the time of reproduction processing, on the basis of these pieces of information, that is, information of the video encoding end time and audio encoding end time, the take-out timing of video and audio bit streams is adjusted. In this case, by taking into consideration the own terminal skew, that is, the required time difference for encoding of accumulated audio and video, strict synchronous take-out is possible. As a result, audio and video can be synchronized in data output from the accumulation device 507 to the multiplexer or decoder. The multiplexed bit stream multiplexed and issued by the multiplexer, that is, the multiplexed bit stream composed of video encoding frame and audio encoding frame is transmitted to the terminal device at the destination.

Figure 7:
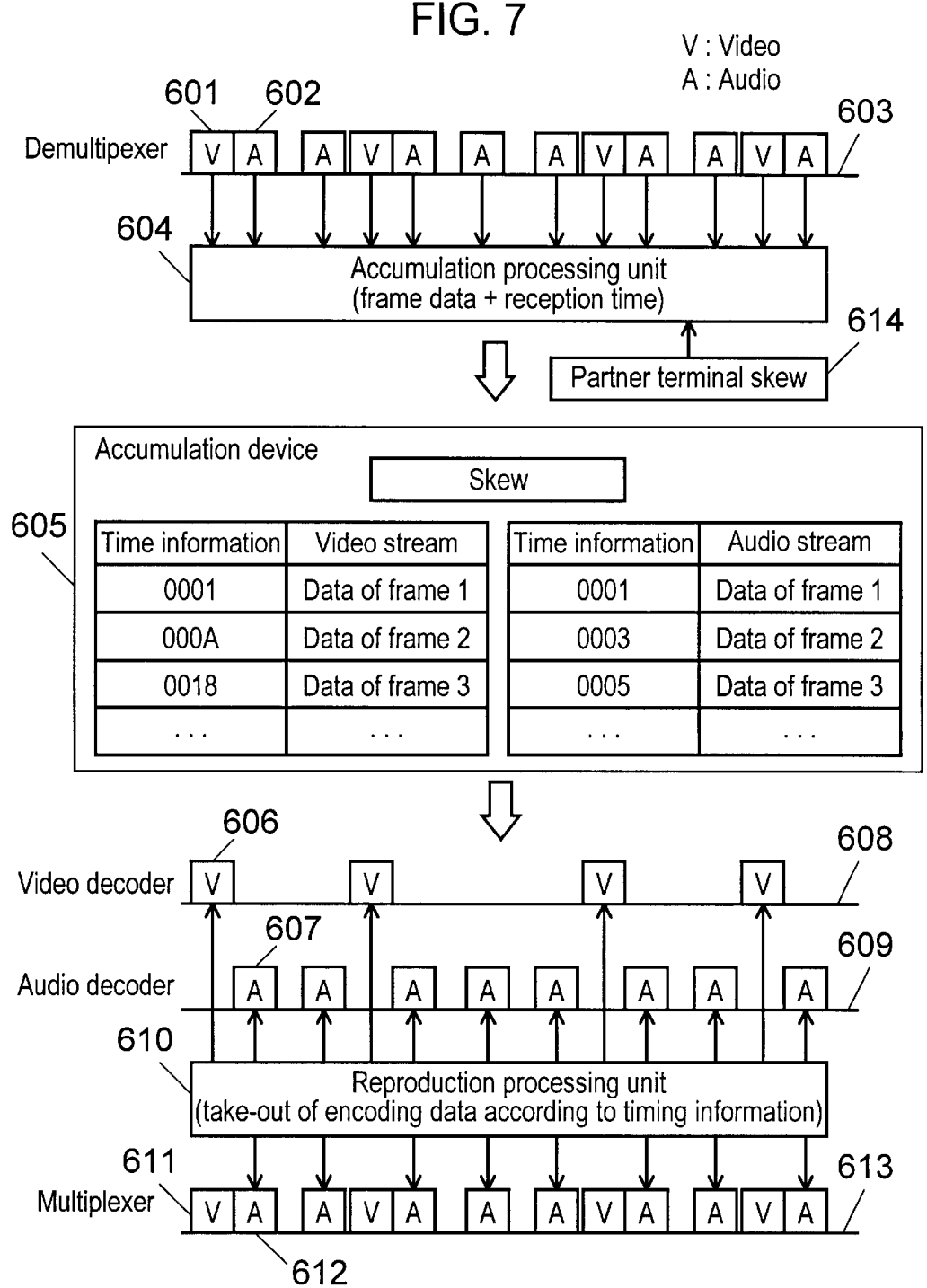
FIG. 7 is a diagram explaining a case of receiving and accumulating video and audio bit streams generated by the transmission side encoder, in the image communication apparatus in embodiment 1 of the invention.

FIG. 7 is a diagram explaining the case of receiving and accumulating video and audio bit streams generated by the encoder of the terminal device at the destination. In FIG. 7, reference numeral 603 is a time axis of a demultiplexer, 601 is a reception position of video encoding frame, 602 is a reception position of audio encoding frame, and 604 is an accumulation processing unit.

Reference numeral 605 is an accumulation device, 606 is a decoding start position of video encoding frame, 607 is a decoding start position of audio encoding frame, 608 is a time axis of video decoder, 609 is a time axis of audio decoder, 610 is a reproduction processing unit, 611 is a multiplexed bit stream position of video encoding frame, 612 is a multiplexed bit stream position of audio encoding frame, and 613 is a time axis of multiplexer.

The video encoding frame and audio encoding frame encoded in the terminal device at the transmission side are multiplexed, and sent to the own terminal device. In the own terminal device, they are separated into video and audio frame data by the demultiplexer.

When accumulating the received audio data and video data in the accumulation device 605, the accumulation processing unit 604 accumulates in the accumulation device 605 by adding data showing each reception time to the video and audio frame data. That is, as shown in FIG. 7, in the accumulation processing unit 604, each frame data and reception time (reception position) of frame beginning position are acquired, and stored in the accumulation device 605 while distinguishing between audio and video. Reference numeral 614 shows the synchronism deviation time of audio and video in the multiplexed bit stream received in the own terminal device, and it is called the partner terminal skew because it is the time deviation required for encoding of audio and video in the terminal device at the transmission side.

At the time of reproduction processing, on the basis of these pieces of information, that is, information of the reception time of beginning position of video frame and reception time of beginning position of audio frame, the take-out timing of video and audio bit streams is adjusted. In this case, by taking into consideration the partner terminal skew showing the synchronism deviation between audio and video in the received multiplexed bit stream, strict synchronous take-out is possible. As a result, audio and video can be synchronized in data output from the accumulation device 605 to the multiplexer or decoder.

Embodiment 2

A television conference system in embodiment 2 of the invention is described while referring to FIG. 8 to FIG. 17.

Figure 8:
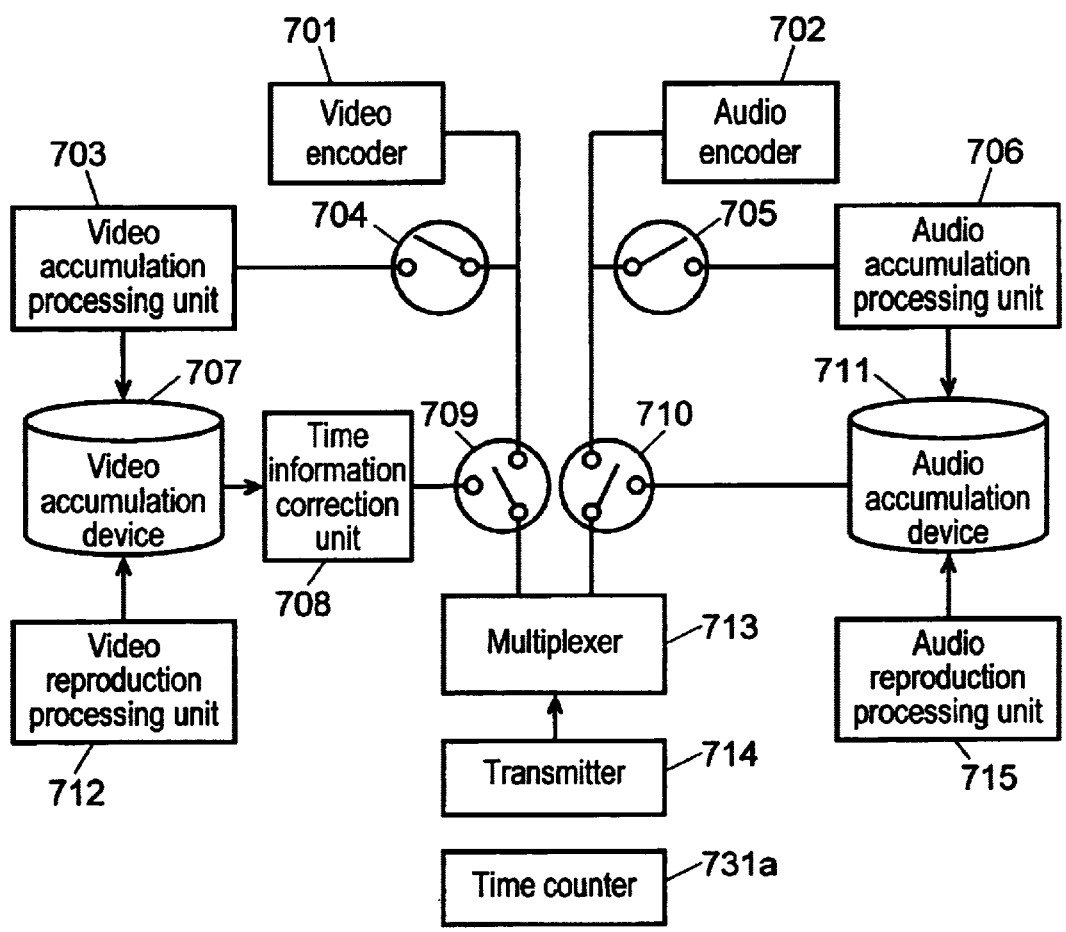
FIG. 8 is a block diagram showing a transmission unit of a television conference system in embodiment 2 of the invention.
Figure 9:
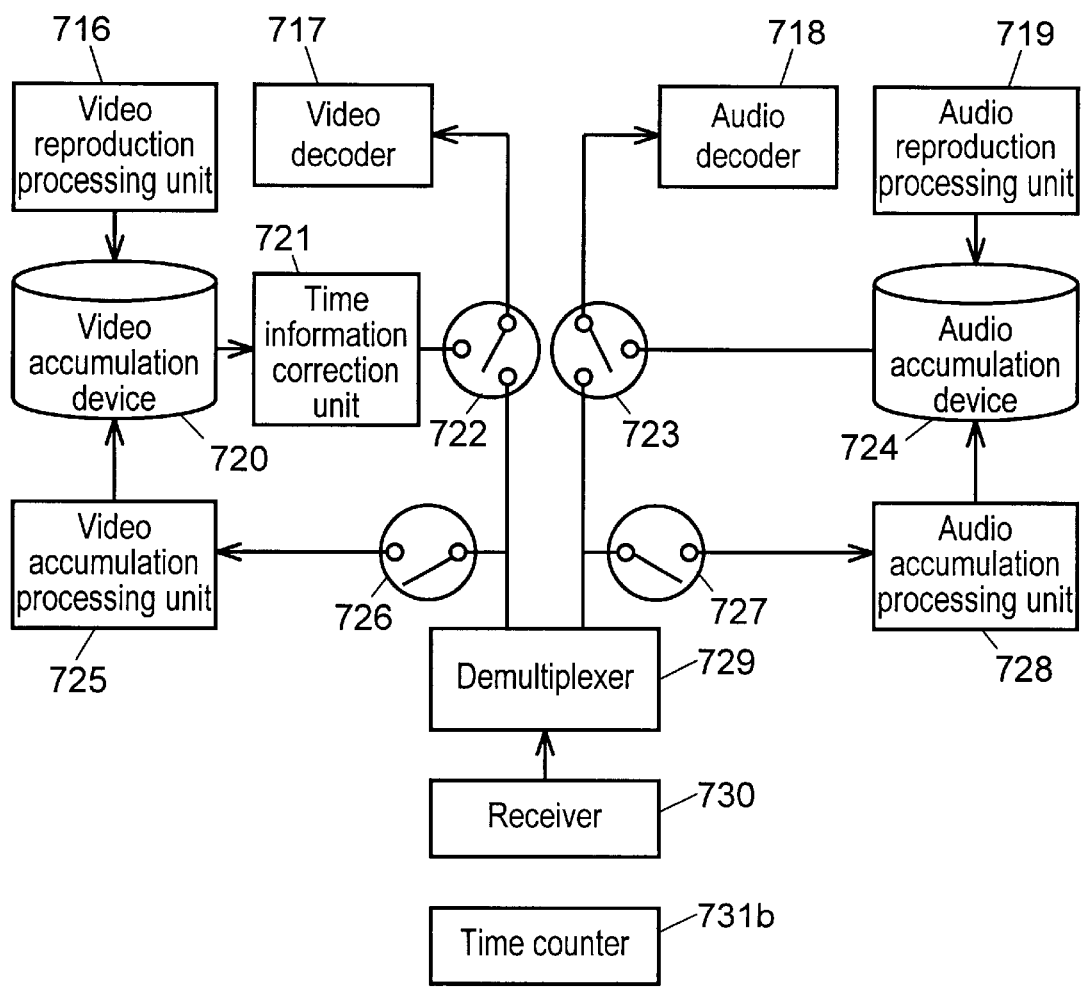
FIG. 9 is a block diagram showing a reception unit of the television conference system in embodiment 2 of the invention.

FIG. 8 is a block diagram showing a transmission unit of the television conference system in embodiment 2 of the invention, and FIG. 9 is a block diagram showing a reception unit of the television conference system in embodiment 2 of the invention, in which accumulated data can be transferred.

The output of a video encoder 701 for generating encoding bit streams of real-time image is connected to one terminal of a video accumulation switch 704 and one fixed terminal of a video transmission path changeover switch 709. Other terminal of the video accumulation switch 704 is connected to a video accumulation device 707 for accumulating encoded video data through a video accumulation processing unit 703. The output of a video reproduction processing unit 712 is also connected to the video accumulation device 707. The output of the video accumulation device 707 is issued to other fixed terminal of the video transmission path changeover switch 709 through a time information correction unit 708 for correcting the time information existing in every frame in the video bit stream being read out from the video accumulation device 707. The video transmission path changeover switch 709 changes over the path for directly sending out the real-time video bit stream from the video encoder 701, and the path for sending out the video bit stream being read out from the video accumulation device 707. The changeover terminal of the video transmission path changeover switch 709 is fed into a multiplexer 713 for multiplexing video bit stream and audio bit stream.

The output of an audio encoder 702 for generating encoding bit streams of real-time audio is connected to one terminal of an audio accumulation switch 705 and one fixed terminal of an audio transmission path changeover switch 710, and changeover terminal of the audio transmission path changeover switch 710 is fed into the multiplexer 713 for multiplexing video bit stream and audio bit stream. Other terminal of the audio accumulation switch 705 is connected to an audio accumulation device 711 for accumulating encoded audio data through an audio accumulation processing unit 706. The output of an audio reproduction processing unit 715 is also connected to the audio accumulation device 711. The output of the audio accumulation device 711 is issued to other fixed terminal of the audio transmission path changeover switch 710. The audio transmission path changeover switch 710 changes over the path for directly sending out the real-time audio bit stream from the audio encoder 702, and the path for sending out the audio bit stream being read out from the audio accumulation device 711. The changeover terminal of the audio transmission path changeover switch 710 is fed into the multiplexer 713 for multiplexing video bit stream and audio bit stream. The output of the multiplexer 713 is connected to a transmitter 714 for transmitting the multiplexed bit stream. Reference numeral 731*a* is a time counter.

In the reception unit shown in FIG. 9, the output of a receiver 730 is issued to a demultiplexer 729 for separating the multiplexed bit stream into video and audio encoding bit streams. The video data output from the demultiplexer 729 is connected to one fixed terminal of a video reception path changeover switch 722 and one terminal of a video accumulation switch 726. Other terminal of the video accumulation switch 726 is connected to a video accumulation device 720 through a video accumulation processing unit 725. The output of a video reproduction processing unit 716 is connected to the video accumulation device 720. The output of the video accumulation device 720 is connected to other fixed terminal of the video reception path changeover switch 722 through a time information correction unit 721 for correcting the time information existing in every frame in the video bit stream being read out from the video accumulation device 720. The video reception path changeover switch 722 changes over the path for directly sending out the video bit stream received and issued from a demultiplexer 729, and the path for sending out the video bit stream being read out from the video accumulation device 720. The changeover terminal of this switch is connected to the input of a video decoder 717 for decoding video data from the video encoding bit stream.

The audio data output from the demultiplexer 729 is connected to one fixed terminal of an audio reception path changeover switch 723 and one terminal of an audio accumulation switch 727. Other terminal of the audio accumulation switch 727 is connected to an audio accumulation device 724 through an audio accumulation processing unit 728. The output of an audio reproduction processing unit 719 is connected to the audio accumulation device 724. The output of the audio accumulation device 724 is connected to other fixed terminal of the audio reception path changeover switch 723. The audio reception path changeover switch 723 changes over the path for directly sending out the audio bit stream received and issued from the demultiplexer 729, and the path for sending out the audio bit stream being read out from the audio accumulation device 724. The changeover terminal of this switch is connected to the input of an audio decoder 718 for decoding audio data from the audio encoding bit stream. Reference numeral 731*b* is a time counter.

Incidentally, the time counter 731*a* in FIG. 8 and time counter 731*b* in FIG. 9 may be commonly used in the transmission unit and reception unit. The time information correction unit 411 explained in FIG. 5 corresponds to the time information correction unit 708 in the transmission unit (FIG. 8) and the time information correction unit 721 in the reception unit (FIG. 9). The accumulation processing unit 506 in FIG. 6 corresponds to the video accumulation processing unit 703 and audio accumulation processing unit 706 shown in FIG. 8. The reproduction processing unit 512 in FIG. 6 corresponds to the video reproduction processing unit 712 and audio reproduction processing unit 715 shown in FIG. 8. The accumulation processing unit 604 in FIG. 7 corresponds to the video accumulation processing unit 725 and audio accumulation processing unit 728 in the reception unit shown in FIG. 9. The reproduction processing unit 610 in FIG. 7 corresponds to the video reproduction processing unit 716 and audio reproduction processing unit 719 in the reception unit shown in FIG. 9.

In thus constituted television conference system, the operation is described below. Referring first to FIG. 8, the transmission operation is briefly described below.

Flows of two paths of video bit stream and audio bit stream are combined into one path by the multiplexer 713, and the multiplexed bit stream is transferred to the partner at the destination by the transmitter 714. The transmission path changeover switches 709 and 710 are respectively connected to the video encoder 701 and audio encoder 702 at the time of ordinary television conference, that is, when sending real-time video data and audio data. The transmission path changeover switches 709 and 710 are changed over to the video accumulation device 707 and audio accumulation device 711, respectively, when sending out accumulated video data and audio data.

To accumulate video data and audio data, by turning on the video accumulation switch 704 and audio accumulation switch 705, the video encoding bit stream and audio encoding bit stream are sent into the video accumulation device 707 through the video accumulation processing unit 703 and into the audio accumulation device 711 through the audio accumulation processing unit 706, and accumulated into the individual accumulation devices through the video accumulation processing unit 703 and audio accumulation processing unit 706.

In this period, the encoding bit streams are stored in the video accumulation device 707 and audio accumulation device 711 together with the time information. That is, in the video accumulation device 707, the video encoding bit stream is stored together with the time information, and in the audio accumulation device 711, the audio encoding bit stream is stored together with the time information.

When reading out the video encoding bit stream and audio encoding bit stream from the video accumulation device 707 and audio accumulation device 711, and sending out to the destination, the operation is as follows. At this time, the video reproduction processing unit 712 and audio reproduction processing unit 715 are intended to control the output state of the accumulated bit streams when transmitting the accumulated data, and give transfer instructions according to the timing information to the bit streams in the video accumulation device 707 and the audio accumulation device 711.

When reading out the video bit stream from the video accumulation device 707, the time information correction unit 708 rewrites the time information in the video frame information to the value calculated from the time of issuing a changeover signal for changing over the video transmission path changeover switch 709 to the video accumulation device 707 and the time information of the first frame of the data being read out. By this correction process, the duration from the display start point of the last frame of the real-time image till the display start point of accumulated bit stream can be kept constant by force. It hence absorbs the time difference between the real-time video bit stream flowing in the video channel and the video bit stream being read out from the accumulation device, so that the display is immediately changed over to the accumulated image.

When sending out the still image accumulated in the video accumulation device 707, the video reproduction processing unit 712 functions to retransmit the still image periodically. That is, by sending the same content as the still image bit stream once transmitted again at a specific time interval by rewriting only the time information, breakdown of the decoder at the destination of communication is prevented.

The outline of the reception operation is described below by reference to FIG. 9. The bit stream received in the receiver 730 is separated into two paths of audio and video bit streams in the demultiplexer 729. These bit streams are usually decoded by the video decoder 717 and audio decoder 718 through the video reception path changeover switch 722 and audio reception path changeover switch 723, and converted into visible video data and crude audio data. The reception path changeover switches 722., 723 are usually connected to the demultiplexer 729 side, and the image and the voice of the transmission side are given to the video decoder 717 and audio decoder 718. In this state, real-time video data and audio data are received, and decoded, and sent to a display unit which is not shown in the drawing.

When accumulating, reading and reproducing the received bit stream, by turning on the video accumulation switch 726 and audio accumulation switch 727, the received video and audio bit streams are transferred to the video accumulation processing unit 725 and audio accumulation processing unit 728, and stored in the video accumulation device 720 and audio accumulation device 724 together with the reception time information.

Next is explained the processing when reproducing accumulated bit streams. The reception path changeover switches 722, 723 are changed over to the accumulation devices 720, 724. The reproduction processing units 716, 719 control the output state of the accumulated bit streams, and give output requests of bit streams to the accumulation devices 720, 724 according to the timing information in the accumulation devices 720, 724.

Getting into the reproduction process, the time information correction unit 721 rewrites the time information in the video frame information being read out from the video accumulation device 720 to the value calculated from the time of issuing a changeover signal for changing over the video reception path changeover switch 722 to the video accumulation device 720 and the time information of the first frame of the data being read out. In this case, too, since the duration from the display start point of the last frame of the real-time dynamic image immediately before till the display start point of accumulated bit stream can be kept constant by force, it absorbs the time difference between the dynamic image bit stream and the video bit stream being read out from the accumulation device, so that the display is immediately changed over to the accumulated image.

When reproducing the still images accumulated in the video accumulation device 720, the video reproduction processing unit 716 also has a function of reading out the still images periodically. That is, by reading out the same content as the still image bit stream once read out from the video accumulation device 720 again at a specific time interval by rewriting only the time information, and sending out to the video decoder 717, breakdown of the video decoder 717 is prevented.

Figure 10:
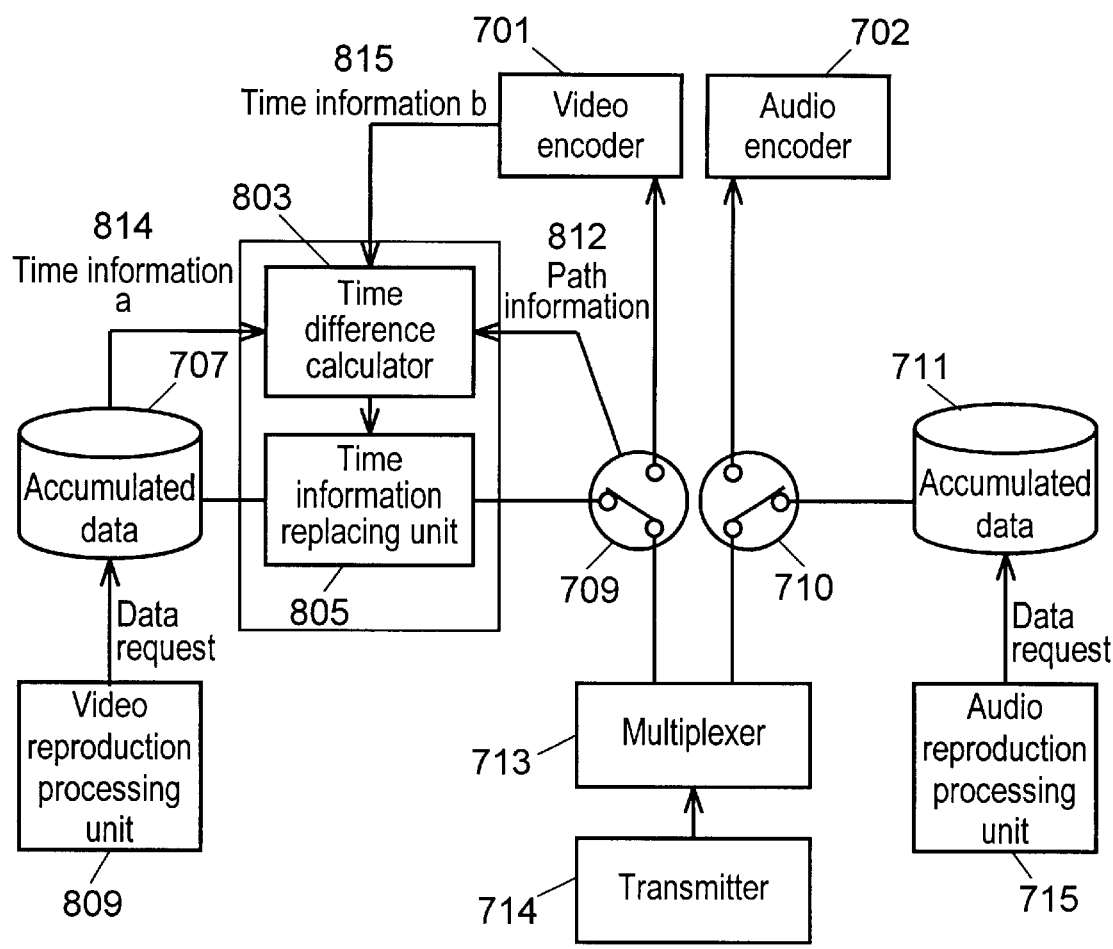
FIG. 10 is a block diagram showing a portion relating to time information correction unit in the transmission unit of the television conference system.

The time information correction unit 708 in FIG. 8 and time information correction unit 721 in FIG. 9 are more specifically described below while referring to FIG. 10 to FIG. 13. FIG. 10 is a block diagram showing a portion relating to time information correction unit in the transmission unit of the television conference system, FIG. 11 is an explanatory diagram showing operation of time information correction unit in the transmission unit of the television conference system, FIG. 12 is a block diagram showing a portion relating to time information correction unit in the reception unit of the television conference system, and FIG. 13 is an explanatory diagram showing operation of time information correction unit in the reception unit of the television conference system.

Figure 11:
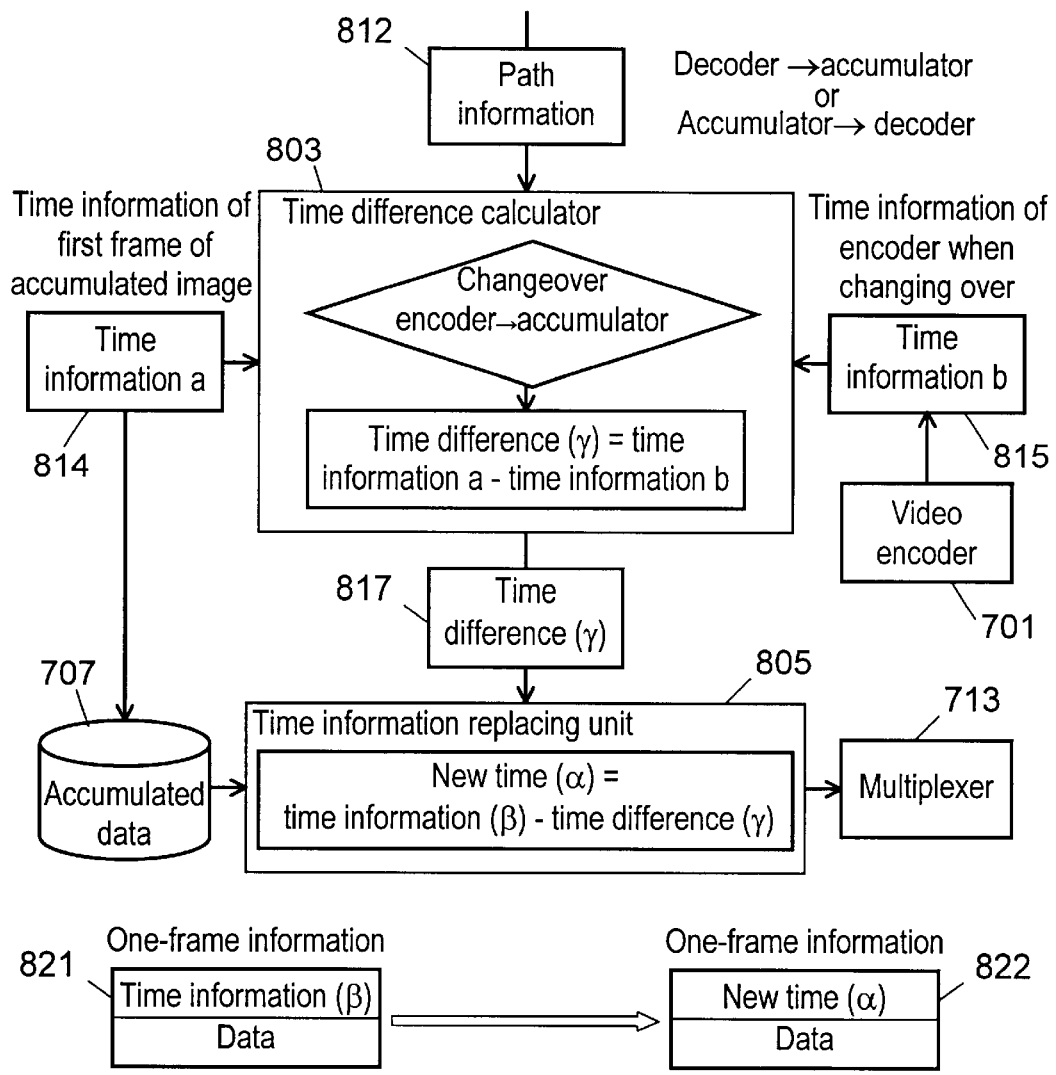
FIG. 11 is an explanatory diagram showing operation of time information correction unit in the transmission unit of the television conference system.
Figure 12:
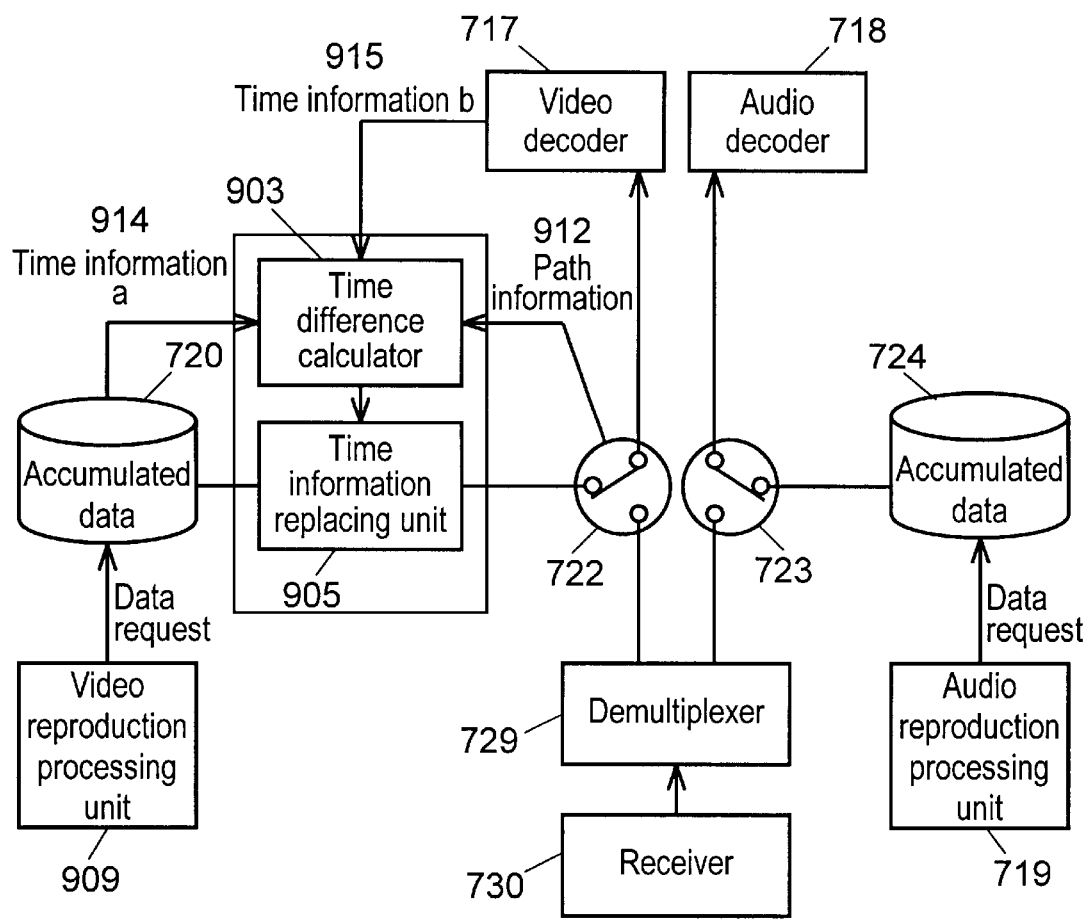
FIG. 12 is a block diagram showing a portion relating to time information correction unit in the reception unit of the television conference system.
Figure 13:
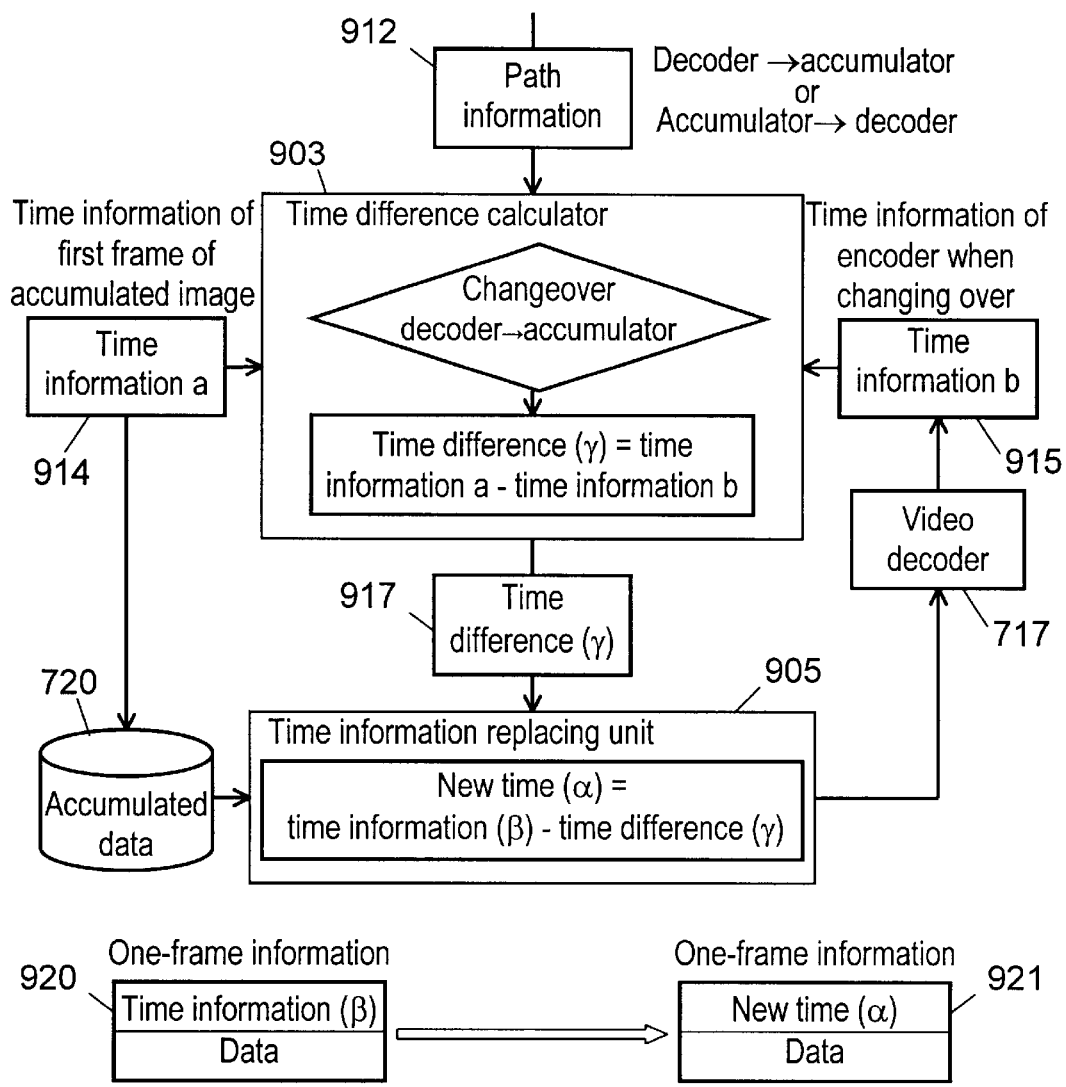
FIG. 13 is an explanatory diagram showing operation of time information correction unit in the reception unit of the television conference system.

In FIG. 10 to FIG. 13, a time difference calculation unit 803 acquires time information (a) 814 from the video accumulation device 707, and path information 812 from the video transmission path changeover switch 709. A time information replacing unit 805 replaces the time information in the data from the video accumulation device 707 according to the time difference 817 as a result of calculation in the time difference calculation unit 803. A video reproduction processing unit 809 issues a video data output request. In FIG. 12 and FIG. 13, moreover, a time difference calculation unit 903 acquires time information (a) 914 from the video accumulation device 720, time information (b) 915 from the video decoder 717, and path information 912 from the video reception path changeover switch 722. A time information replacing unit 905 replaces the time information in the data from the video accumulation device 720 according to the time difference 917 as a result of calculation in the time difference calculation unit 903. A video reproduction processing unit 909 issues a video data output request. In FIG. 8 and FIG. 9, parts having same functions are identified with same reference numerals.

Next, referring to FIG. 11 (transmission unit) and FIG. 13 (reception unit), the time information replacing operation is described below.

In FIG. 11, in order to replace the time information in the transmission unit, it is required to acquire the deviation between the time axis of accumulated image and time axis of the partner decoder. The time axis of the decoder of the terminal device at the destination is synchronized with the time axis of the encoder of the own terminal device, and therefore the time difference 817 (time difference γ=time information a−time information b) of the time information 815 (time information b) of the video encoder 701 of the own terminal device (transmission unit) and the time information 814 (time information a) of the first frame of the accumulated data is the deviation of the time axis from the decoder at the destination of communication. Besides, since the updating speed of the time axis of the decoder and time axis of accumulated image is the same, the deviation at the beginning is same as the deviation of all frames. Hence, the calculation of difference is required only once when the communication path is changed over from the video encoder 701 to the video accumulation device 707.

On the basis of the time difference (γ) 817, the time information replacing unit 805 generates a frame 822 rewriting only the time information portion (time information β) of a frame 821 issued from the video accumulation device 707 according to the request of the video reproduction processing unit 809 (FIG. 10), and transfers to the multiplexer 713. By thus transferring the frame rewriting only the time information portion (time information β), it is possible to transmit the accumulated video bit stream to the terminal device at the destination using the dynamic image channel.

To the contrary, when reproducing the accumulated image in the own terminal device in the reception unit, it is processed as shown in FIG. 13. In this case, in the own terminal device, time information 915 (time information b) is acquired from the video decoder 717. The other is same as the operation of the transmission unit described above, and its explanation is omitted.

Thus, according to the embodiment, since the transmission unit has the time information correction unit 708 comprising the time difference calculation unit 803 and time information replacing unit 805, it is possible to correct the time information existing in every frame in the bit stream of the accumulated image, absorb the time difference from the bit stream of the image flowing in the video channel, and replace the content of the accumulated video data and content of the real-time video data flowing in the video channel in the transmission direction without waiting time.

In the reception unit, too, having the time information correction unit 721 comprising the time difference calculation unit 903 and time information replacing unit 905, it is possible to correct the time information existing in every frame in the bit stream of the accumulated image, absorb the time difference from the bit stream of the image flowing in the video channel, and replace the content of the accumulated video data and content of the real-time video data flowing in the video channel in the reception direction without waiting time.

When reproducing the accumulated still images, moreover, the time information correction units 708, 721 transfer again the same still images as already transferred by correcting only the time information of bit streams, and therefore breakdown of the video decoder of the own or partner terminal can be prevented.

Figure 14:
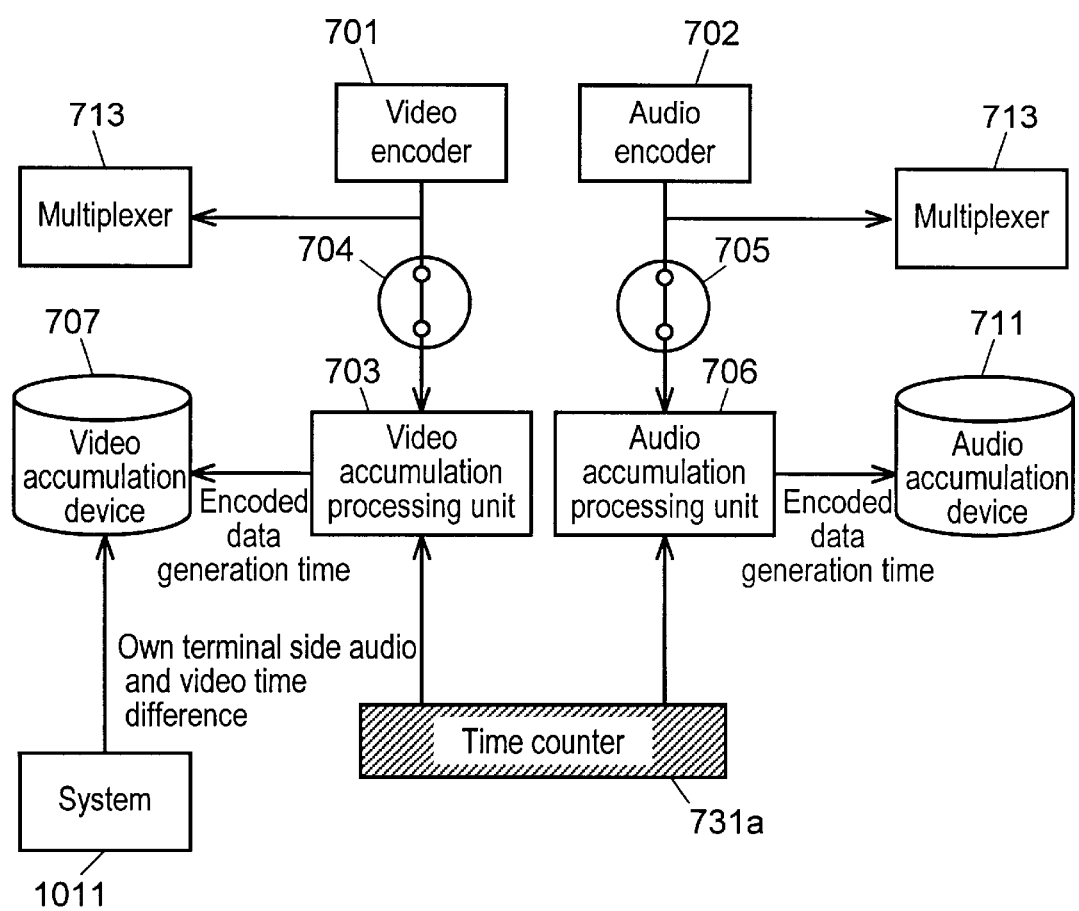
FIG. 14 is an explanatory diagram of audio and video bit stream accumulation.

The operation of the video accumulation processing unit 703 and audio accumulation processing unit 706 in FIG. 8 is described below by referring to FIG. 14 showing the images of the own terminal device and the accumulation operation of the bit streams generated in the audio encoder, mainly relating to each accumulation device. In FIG. 14, the constitution is same as in FIG. 8 except that the system unit 1011 for controlling communication is added, and parts of same functions are identified with same reference numerals.

The video accumulation processing unit 703 and audio accumulation processing unit 706 are put in operation when the video accumulation switch 704 and audio accumulation switch 705 are turned on. The video encoder 701 and audio encoder 702 generate bit streams at every end of encoding of one frame, which are stored in the accumulation devices 707, 711 by the accumulation processing units 703, 706.

The value of the time counter 731a is read out at every end of encoding, and stored in the accumulation devices 707, 711 as the take-out information of the bit streams of corresponding frames. In the video accumulation device 707, the own terminal skew is also stored as the encoding time difference between audio and video.

Thus, the accumulation processing units 703, 706 accumulate data of each frame and encoding end time while distinguishing between audio data and video data, and therefore, at the time of reproduction processing, the take-out timing of video and audio bit streams can be adjusted on the basis of the data of each frame and encoding end time, so that the audio and video synchronism is achieved at the time of data output from the accumulation devices 707, 711 to the multiplexer 713.

Moreover, since the accumulation processing units 703, 706 accumulate the own terminal skew, strict synchronous take-out of audio and video is realized.

Figure 15:
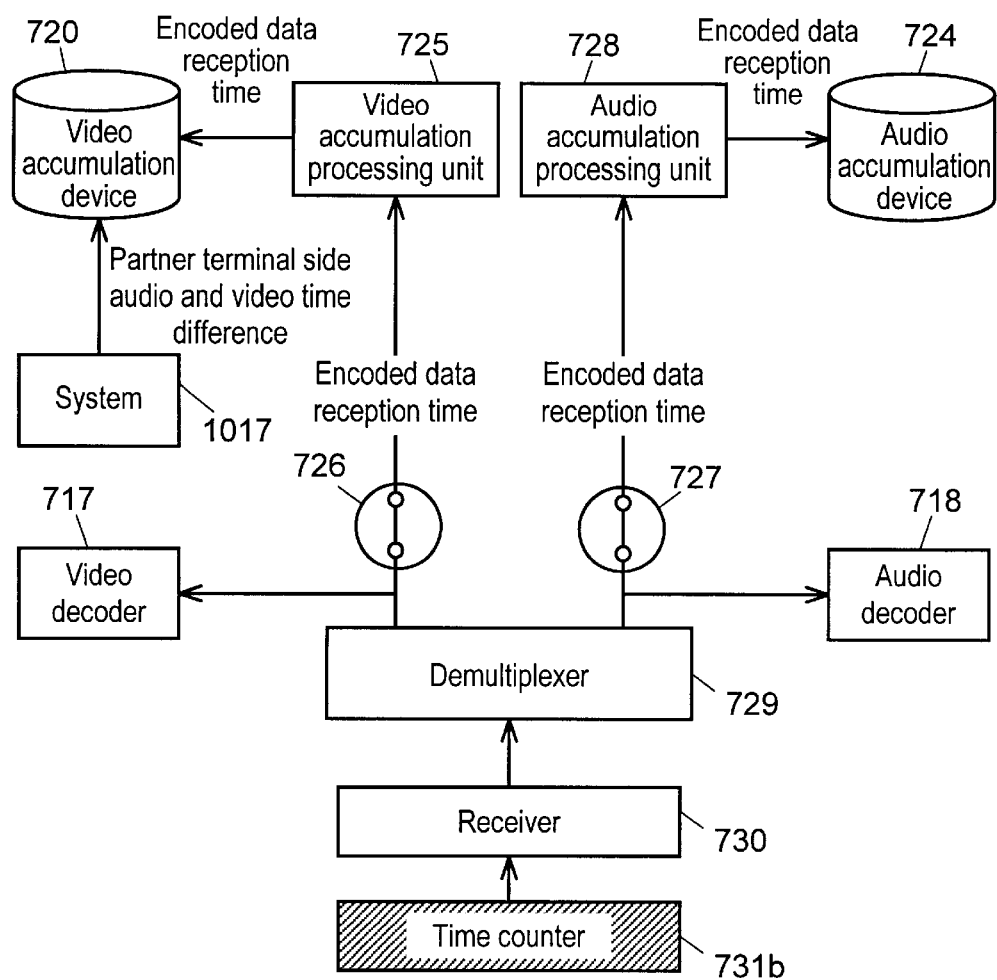
FIG. 15 is an explanatory diagram of audio and video bit stream accumulation.

The operation of the video accumulation processing unit 725 and audio accumulation processing unit 728 in FIG. 9 is described below by referring to FIG. 15 showing reception of bit streams generated in the video and audio encoders of the terminal device at the transmission side and accumulation thereof in the video and audio accumulation device at the own terminal device, mainly relating to each accumulation device. In FIG. 15, the constitution is same as in FIG. 9 except that the system unit 1017 for controlling communication is added, and parts of same functions are identified with same reference numerals.

The video accumulation processing unit 725 and audio accumulation processing unit 728 are put in operation when the video accumulation switch 726 and audio accumulation switch 727 are turned on. The multiplexed bit stream received in the receiver 730 is put into the demultiplexer 729 together with its reception time information, and separated into video and audio bit streams. The separated bit streams are put into the accumulation processing units 725 and 728 together with the reception time information.

The accumulation processing units 725, 728 generate bit streams of every frame division and the reception time information at the beginning on the basis of such information, and store the video and audio bit streams together with such information in the video accumulation device 720 and audio accumulation device 724. In the video accumulation device 720, the skew of the terminal device at the transmission side is also stored as the synchronization deviation information between audio and video at the time of reception.

Thus, the accumulation processing units 725, 728 accumulate data of each frame and reception time at the beginning position of each frame while distinguishing between audio data and video data, and therefore, at the time of reproduction processing, the take-out timing of video and audio bit streams can be adjusted on the basis of the data of each frame and reception time of frame beginning position, so that the audio and video synchronism is achieved at the time of data output from the accumulation devices to the video decoder or audio decoder.

Moreover, since the accumulation processing units 725, 728 accumulate the partner terminal skew, strict synchronous take-out of audio and video is realized.

Figure 16:
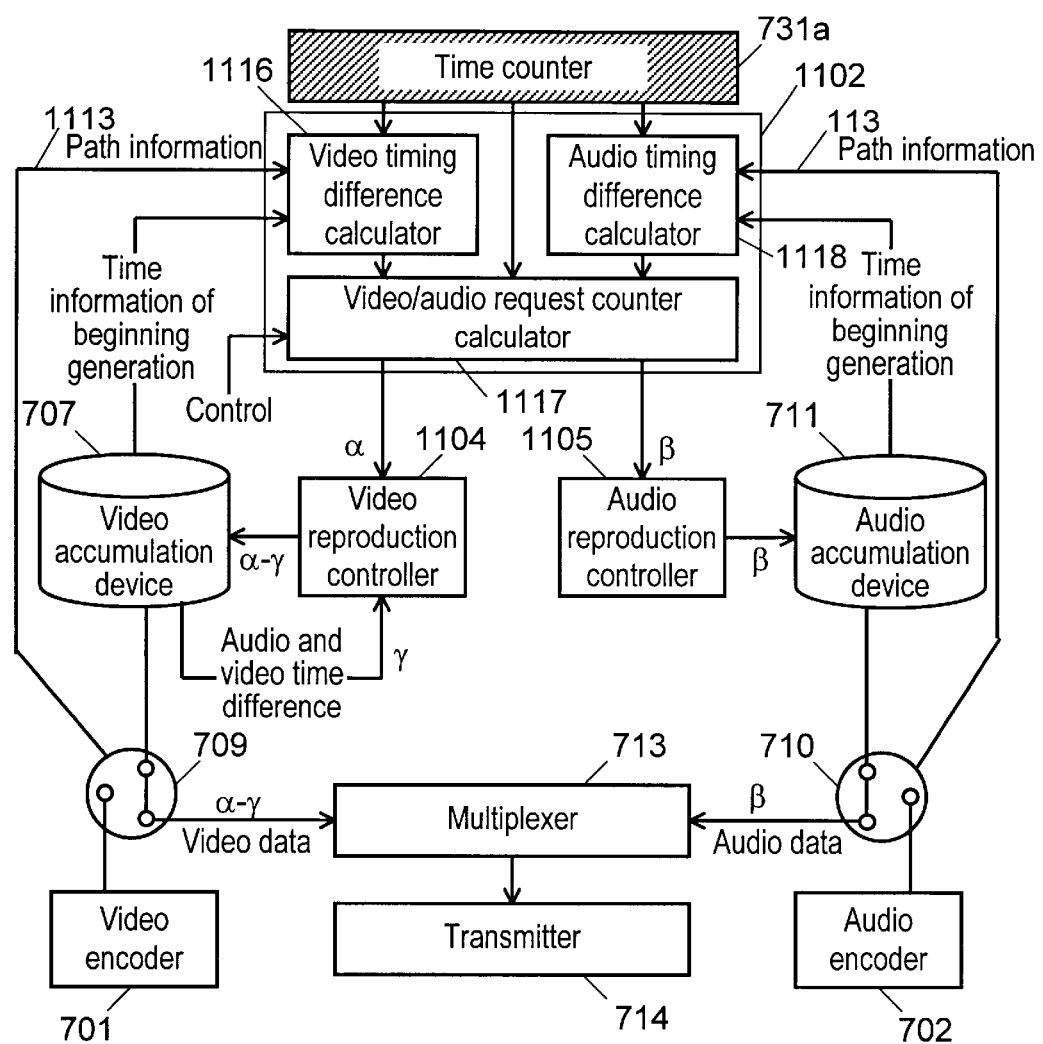
FIG. 16 is an explanatory diagram of audio and video accumulation bit stream output.

The operation of the video reproduction processing unit 712 and audio reproduction processing unit 715 in the transmission unit in FIG. 8 and the operation of the video reproduction processing unit 716 and audio reproduction processing unit 719 in the reception unit in FIG. 9 are described in detail below while referring to FIG. 16 and FIG. 17. FIG. 16 is an explanatory diagram at the time of output of accumulated video and audio data as bit streams, and FIG. 17 is an explanatory diagram showing detail about the output of the accumulated video bit streams.

In FIG. 16, a difference calculator 1102 comprises a video timing difference calculator 1116, a video/audio request counter calculator 1117, and an audio timing difference calculator 1118, and a video reproduction controller 1104 for issuing an output request to the video accumulation device 707 and an audio reproduction controller 1105 for issuing an output request to the audio accumulation device 711 are controlled by the video/audio request counter calculator 1117. The video encoder 701, video accumulation device 707, video transmission path changeover switch 709, audio encoder 702, audio accumulation device 711, audio transmission path changeover switch 710, multiplexer 713, transmitter 714, and time counter 731a are same as shown in FIG. 8, and hence are provided with same reference numerals.

Figure 17:
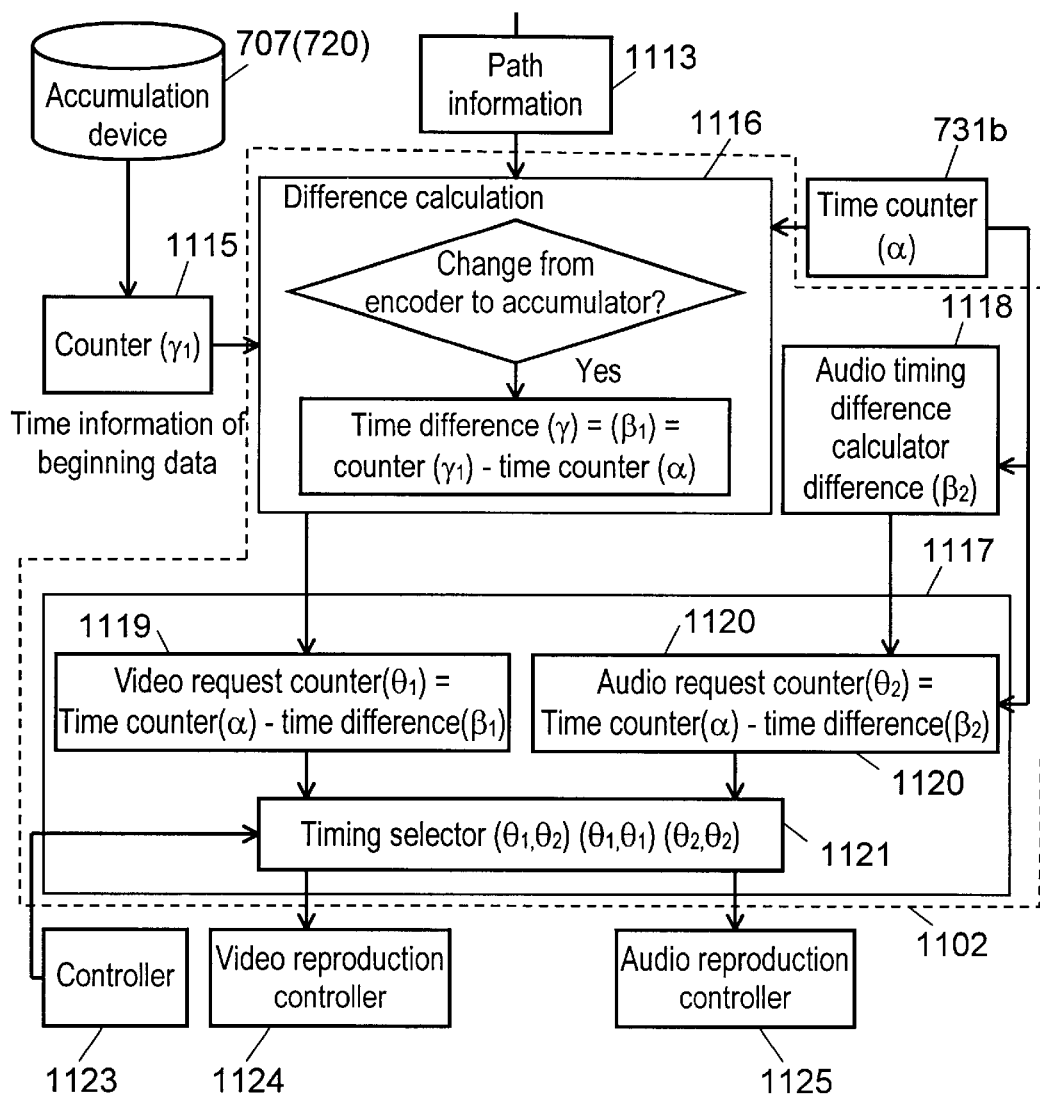
FIG. 17 is an explanatory diagram of audio and video accumulation bit stream output.

FIG. 17 shows further specifically the operation of the video timing difference calculator 1116 and the constitution of the video/audio request counter calculator 1117.

In FIG. 17, the video/audio request counter calculator 1117 comprises a video request counter calculator 1119, an audio request counter calculator 1120, and a timing selector 1121. Peripheral parts include a controller 1123 for controlling the timing selector 1121, a video reproduction controller 1124 for issuing a video output request, and an audio reproduction controller 1125 for issuing an audio output request.

The operation is described below. In FIG. 16, as the video reproduction path switch 709 and audio reproduction path switch 710 are connected to the video accumulation device 707 and audio accumulation device 711, the video reproduction controller 1104 and audio reproduction controller 1105 (corresponding to the video reproduction processing unit 712 and audio reproduction processing unit 715) are put in operation.

The information of the reproduction path switches 709, 710 is sent to the difference calculator 1102 as the path information 1113, and the difference is calculated only once.

As shown in FIG. 17, in the difference calculator 1102, the video timing difference calculator 1116 calculates the time difference ($\alpha=\beta1$=counter $\gamma1$−time counter $\alpha$) of the time information 1115 of the first frame of the accumulated image and the present time counter 731b, and feeds the result into the video request counter calculator 1119. The video request counter calculator 1119 calculates the difference ($\theta1$) between the present time counter 731b ($\alpha$) and the time difference ($\beta1$), and sends the result to the timing selector 1121.

As for the audio signal, likewise, similar operations are done by the audio timing difference calculator 1118 and audio counter calculator 1120, and the calculation result ($\theta2$) is sent into the timing selector 1121.

For example, when the time counter ($\alpha$) changes as 1, 2, 3, 4, 5, 6, 7, 8, 9, 10, ..., and the count of the first frame of the accumulated image being changed over is 54, 60, 62, ..., the difference ($\gamma$) is 53. The video counter ($\theta1$) is 1, 7, 9, ...

The timing selector 1121 selects, depending on the control information from the system controller 1123, whether the request time information given to the video reproduction controller 1124 and audio reproduction controller 1125 should be "matched to the image ($\theta1$, $\theta1$)," or "matched to the voice ($\theta2$, $\theta2$)," or "independent for the both ($\theta1$, $\theta2$)."

These operations are done separately for audio and video when there is a relation between audio and video accumulated data, and they must be synchronized strictly. For example, this technique is employed for synchronizing the timing of the audio data to match with the motion of the mouth in the case of an image showing a person speaking. In this mode, audio and video operate on independent counters ($\theta1$, $\theta2$). When audio and video are started at the same time in recording, $\theta1$ and $\theta2$ are usually the same values. Incidentally, if only the audio data is replaced later as in after-recording, $\theta1$ and $\theta2$ are different values.

In this method only, reproduction of first frame of accumulated data is started at the same time, but depending on the cases, it cannot be applied to the case of starting accumulation of image only when recording and adding the voice later, and in such cases, the image first ($\theta1$, $\theta2$) and voice first ($\theta2$, $\theta2$) techniques are employed.

In the video reproduction controller 1124, aside from the request time information, the skew difference, that is, the difference between the skew of the accumulated data and the skew of the path for data flow is given, and by shifting the video output position before or after the request time information by the portion of such difference only, the synchronous output is adjusted by matching with the output path.

Using these pieces of information, the video reproduction controller 1124 and audio reproduction controller 1125 issues output requests to the accumulation devices 707, 711 on the basis of the timing information possessed by the video accumulation device 707, and issues bit streams synchronized between audio and video.

The television conference system is shown as an example in the foregoing embodiments, but the invention is not limited to these examples only, and is applied to all of communication apparatuses for transmitting including images.

FIG. 1
Audio channel
Video channel
Control channel
Data channel
101     Microphone   Audio encoder
       Camera     Video encoder
       System     Control encoder
102     Application specification
103     Protocol
108     Multiplexer
109     Demultiplexer
110     Audio decoder   Speaker
       Video decoder   Display unit
       Control decoder   System
111     Protocol
112     Application specification
FIG. 2
Accumulation stream
Encoder stream
Decoder stream
Display interval
Max.
FIG. 3
707     Video accumulation device
708     Time information correction unit
101     Microphone   Audio encoder
       Camera     Video encoder
       System     Control encoder -continued

```
        102     Application specification
        103     Protocol
        108     Multiplexer
        109     Demultiplexer
        110     Audio decoder   Speaker
            Video decoder   Display unit
            Control decoder   System
        111     Protocol
        112     Application specification
        FIG. 4
Accumulation stream
    Encoder stream
    Decoder stream
    Display interval
        303     Time information replacing unit
        301     First frame of accumulated video data
        302     Last frame issued from encoder
        304     Frame after time information replacement of first
frame                                                                 of
    accumulated video data
        305     Display start position of last frame issued from
encoder
        306     Display start position of first frame of accumulated
video data
        FIG. 5
        Time information
        402     Real-time dynamic image
        403     Still image
        Breakdown
Time information
        407     Still                                             image
408     Still                                                     image
409     Still                                                     image
406     Dynamic image
        410     Dynamic image
        411     Time information correction unit
        412     H.263 still image data
        FIG. 6
        Video                                                   encoder
Audio encoder
        501     Video Video Video Video
        502     Audio Audio Audio Audio Audio Audio Audio
Audio
        506     Accumulation processing unit (encoding data +
encoding                                                             end
    timing)
        505     Own terminal skew
        507     Accumulation device
            Skew
            Time     information     Video     stream
        Time information Audio stream
            Data of frame 1    Data of frame 2    Data of frame 3
        Data of frame 1 Data of frame 2 Data of frame 3
        512     Reproduction processing unit (take-out of encoding
data
        according to timing information)
            Video decoder
            Audio decoder
            Multiplexer
        508     Video Video Video Video
        509     Audio Audio Audio Audio Audio Audio
Audio
        FIG. 7
601     Video Video Video Video
                602     Audio Audio Audio Audio Audio Audio
            Audio Audio
                603     Demultipexer
        604     Accumulation processing unit (frame data + reception
time)
        614     Partner terminal skew
        605     Accumulation device
            Skew
            Time     information     Video     stream
        Time information Audio stream
            Data of frame 1    Data of frame 2    Data of frame 3
        Data of frame 1 Data of frame 2 Data of frame 3
        606     Video Video Video Video Video
        607     Audio Audio Audio Audio Audio Audio Audio
```

-continued

```
Audio
            Video                                             decoder
    Audio decoder
        Multiplexer
        610     Reproduction processing unit (take-out of encoding
data    according to time information)
FIG. 8
        701     Video encoder
        702     Audio encoder
        703     Video accumulation processing unit
        706     Audio accumulation processing unit
        707     Video accumulation device
        708     Time information correction unit
        711     Audio accumulation device
        712     Video reproduction processing unit
        713     Multiplexer
        714     Transmitter
        715     Audio reproduction processing unit
        731a    Time counter
        FIG. 9
        716     Video reproduction processing unit
        717     Video decoder
        718     Audio decoder
        719     Audio reproduction processing unit
        720     Video accumulation device
        721     Time information correction unit
        724     Audio accumulation device
        725     Video accumulation processing unit
        728     Audio accumulation processing unit
        729     Demultiplexer
        730     Receiver
        731b    Time counter
        FIG. 10
        803     Time difference calculator
        805     Time information replacing unit
        809     Video     reproduction     processing     unit
    812  Path information
                814     Time information a
                815     Time information b
        707     Accumulated                                      data
    711  Accumulated data
        Data request Data request
        701     Video encoder
        702     Audio encoder
        713     Multiplexer
        714     Transmitter
        715     Audio reproduction processing unit
        FIG. 11
        812     Path information
            Encoder → accumulator
                    or
            Accumulator → encoder
        Time information of first frame of accumulated image
        803     Time difference calculator
        Changeover encoder → accumulator
        Time difference (□) = time information a – time information b
        Time information of encoder when changing over
        Time information replacing unit
            New time (□) = time information (□) – time difference (□)
        One-frame information
        821     Time information (□)
        Data
        One-frame information
        822     New time (□)
        Data
        701     Video encoder
        713     Multiplexer
        814     Time information a
        815     Time information b
        707     Accumulated data
        817     Time                              difference    (□)
        FIG. 12
        903     Time difference calculator
        905     Time information replacing unit
        909     Video reproduction processing unit
                914     Time information a
                915     Time information b
        720     Accumulated data
        724     Accumulated data
```

-continued

```
        Data request Data request
    717     Video decoder
    718     Audio decoder
    729     Demultiplexer
    730     Receiver
    719     Audio reproduction processing unit
    FIG. 13
    912     Path information
        Decoder → accumulator
            or
        Accumulator → decoder
        Time information of first frame of accumulated image
903     Time difference calculator
        Changeover decoder → accumulator
        Time difference (□) = time information a − time information b
        Time information of encoder when changing over
        Time information replacing unit
            New time (□) = time information (□) − time difference (□)
        One-frame information
    920     Time information (□)
        Data
        One-frame information
    921     New time (□)
        Data
    717     Video decoder
    914     Time information a
    915     Time information b
    917     Time difference (□)
    FIG. 14
        Encoded data generation time
        Encoded data generation time
        Own terminal side audio and video time difference
    701     Video encoder
    702     Audio encoder
    703     Video accumulation processing unit
    706     Audio accumulation processing unit
    707     Video accumulation device
    711     Audio accumulation device
    713     Multiplexer
    713     Multiplexer
    731a    Time counter
    1011    System
    FIG. 15
        Encoded data reception time Encoded data reception time
        Encoded data reception time Encoded data reception time
        Partner terminal side audio and video time difference
        Multiplexed data reception time
    717     Video decoder
    718     Audio decoder
    720     Video accumulation device
    724     Audio accumulation device
    725     Video accumulation processing unit
    728     Audio accumulation processing unit
    729     Demultiplexer
    730     Receiver
    731b    Time counter
    1017    System
    FIG. 16
    1116    Video timing difference calculator
    1118    Audio timing difference calculator
    1117    Video/audio request counter calculator
        Time information of beginning generation
        Time information of beginning generation
    1104    Video reproduction controller
    1105    Audio reproduction controller
        Audio and video time difference
        Control
    731a    Time                                counter
707     Video accumulation device
    711     Audio accumulation device
    713     Multiplexer
    714     Transmitter
    701     Video encoder
    702     Audio encoder
FIG. 17
        Difference calculation
        Change from encoder to accumulator?
        Yes
        Time difference (□) = (□₁) = counter (□ □) − time counter (□)
        Time information of beginning data
    1118    Audio timing difference calculator difference (□ □)
    1119    Video request counter (□₁) =
        Time counter (□) − time difference (□₁)
    1120    Audio  request  counter  (□ □)  =
        Time counter (□) − time difference (□ □)
    1121    Timing selector (□₁, □ □) (□₁, □₁) (□ □, □ □)
    1123    Controller
    1124    Video reproduction controller
    1125    Audio reproduction controller
    707     Accumulation                        device
1115    Counter                                 (□ □)
731b    Time counter (□)
```

What is claimed is:

1. An image communication apparatus comprising:
    an accumulation device for accumulating video or audio bit streams, and
    an accumulation processing unit for accumulating data of each frame of bit stream and encoding end time in said accumulation device,
    wherein when accumulating bit streams in said accumulation device, said accumulation processing unit stores the data of each frame and encoding end time in said accumulation device while distinguishing between audio and video, and
    wherein at the time of reproduction processing, audio and video are synchronized by determining the take-out timing of video and audio bit streams on the basis of the difference in the required time of video and audio encoding being read out from said accumulation device.

2. An image communication apparatus for receiving and accumulating video and audio bit streams sent from other communication terminal, comprising:
    an accumulation device for accumulating video or audio bit streams, and
    an accumulation processing unit for accumulating data of each frame of bit stream and reception time of frame beginning position in said accumulation device,
    wherein when accumulating received bit streams in said accumulation device, said accumulation processing unit stores the data of each frame and reception time of each frame beginning position in said accumulation device while distinguishing between audio and video, and
    wherein at the time of reproduction processing, audio and video are synchronized by determining the take-out timing of video and audio bit streams on the basis of the difference in the reception time of video and audio frame beginning position being read out from said accumulation device.

3. An image communication apparatus comprising:
    a video encoder for generating a video encoding bit stream,
    an audio encoder for generating an audio encoding bit stream,
    a video accumulation device for accumulating encoded video data,
    an audio accumulation device for accumulating encoded audio data,
    a video transmission path changeover switch for changing over between a path for directly sending out the real-time video bit stream from said video encoder, and a path for sending out the video bit stream being read out from said video accumulation device, an audio transmission path changeover switch for changing over between a path for directly sending out the real-time audio bit stream from said audio encoder, and a path for sending out the audio bit stream being read out from said audio accumulation device, a multiplexer for multiplexing said video bit stream and audio bit stream, a time counter having
  a first value read out at an end of the video encoding bit stream and stored in the video accumulation device as take-out information of the video encoding bit stream, and
  a second value read out at an end of the audio-encoding bit stream and stored in the audio accumulation device as take-out information of the audio encoding bit stream, a time information correction unit for replacing the time information existing in every frame in the video bit stream being read out from said video accumulation device with a specified value, and transferring to said multiplexer, and a transmitter for transmitting the bit stream multiplexed by said multiplexer.

4. The image communication apparatus of claim 3, wherein said time information correction unit includes:

a time difference calculator for calculating the difference (time difference (γ)=time information a−time information b) of the time information (b) of the video encoder, and time information (a) of the first frame of accumulated data when a changeover signal is generated for changing over the communication path from the encoder to the accumulation device, and a time information replacing unit for rewriting the time information portion of the frame issued from said video accumulation device on the basis of the time difference obtained from said time difference calculator.

5. An image communication apparatus of which reception unit comprises:

a video reproduction processing unit, a video decoder for decoding video data from video encoding bit stream, an audio decoder for decoding audio data from audio encoding bit stream, an audio reproduction processing unit, a receiver for receiving a multiplexed bit stream, a demultiplexer for separating the multiplexed bit stream into video and audio encoding bit streams, a video reception path changeover switch for changing over between a path for receiving and directly sending out the video bit stream being issued from the demultiplexer, and a path for sending out the video bit stream being read out from a video accumulation device, an audio reception path changeover switch for changing over between a path for receiving and directly sending out the audio bit stream being issued from the demultiplexer, and a path for sending out the audio bit stream being read out from an audio accumulation device, an audio accumulation device for accumulating audio data, a video accumulation device for accumulating video data, a video accumulation processing unit, an audio accumulation processing unit, a time counter having
  a first value read out at an end of the video encoding bit stream and stored in the video accumulation device as take-out information of the video encoding bit stream, and
  a second value read out at an end of the audio-encoding bit stream and stored in the audio accumulation device as take-out information of the audio encoding bit stream, and a time information correction unit for replacing the time information existing in every frame in the video bit stream being read out from said video accumulation device with a specified value, and transferring to a video decoder.

6. The image communication apparatus of claim 5, wherein said time information correction unit includes:

a time difference calculator for calculating the time difference (time difference (γ)=time information a−time information b) of the time information (b) of said video decoder, and time information (a) of the first frame of accumulated data when a changeover signal is generated for changing over the communication path from said demultiplexer to said video accumulation device, and a time information replacing unit for rewriting the time information portion of the frame issued from said video accumulation device on the basis of the time difference obtained from said time difference calculator.

7. An image communication apparatus consisting of a transmission unit and a reception unit, wherein said transmission unit comprises:

a video encoder for generating video encoding bit stream, an audio encoder for generating audio encoding bit stream, a video accumulation device for accumulating encoded video data, an audio accumulation device for accumulating encoded audio data, a video transmission path changeover switch for changing over between a path for directly sending out the real-time video bit stream from said video encoder, and a path for sending out the video bit stream being read out from said video accumulation device, an audio transmission path changeover switch for changing over between a path for directly sending out the real-time audio bit stream from said audio encoder, and a path for sending out the audio bit stream being read out from said audio accumulation device, a first time counter having a first value read out at an end of the video encoding bit stream and stored in the video accumulation device as take-out information of the video encoding bit stream, and a second value read out at an end of the audio encoding bit stream and stored in the audio accumulation device as take-out information of the audio encoding bit stream, a first time information correction unit for replacing the time information existing in every frame in the video bit stream being read out from said video accumulation device with a specified value, a multiplexer for multiplexing video bit stream and audio bit stream, and a transmitter for transmitting the bit stream multiplexed by said multiplexer; and said reception unit comprises:
- a video reproduction processing unit,
- a video decoder for decoding video data from video encoding bit stream,
- an audio decoder for decoding audio data from audio encoding bit stream,
- a demultiplexer for separating multiplexed bit stream into video and audio encoding bit streams,
- an audio accumulation device for accumulating audio data,
- a video accumulation device for accumulating video data,
- a video reception path changeover switch for changing over between a path for receiving and directly sending out the video bit stream being issued from said demultiplexer, and a path for sending out the video bit stream being read out from said video accumulation device,
- a second time counter,
- an audio reception path changeover switch for changing over between a path for receiving and directly sending out the audio bit stream being issued from said demultiplexer, and a path for sending out the audio bit stream being read out from said audio accumulation device, and
- a second time information correction unit for replacing the time information existing in every frame in the video bit stream being read out from said video accumulation device with a specified value.

* * * * *